(12) United States Patent
Kakishima et al.

(10) Patent No.: US 11,411,694 B2
(45) Date of Patent: Aug. 9, 2022

(54) METHOD OF APERIODIC SIGNAL TRANSMISSION, BASE STATION, AND USER EQUIPMENT

(71) Applicants: NTT DOCOMO, INC., Tokyo (JP); DOCOMO INNOVATIONS, INC., Palo Alto, CA (US)

(72) Inventors: Yuichi Kakishima, Tokyo (JP); Satoshi Nagata, Tokyo (JP); Chongning Na, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/090,484

(22) PCT Filed: Mar. 31, 2017

(86) PCT No.: PCT/US2017/025450
§ 371 (c)(1),
(2) Date: Oct. 1, 2018

(87) PCT Pub. No.: WO2017/173314
PCT Pub. Date: Oct. 5, 2017

(65) Prior Publication Data
US 2019/0123869 A1    Apr. 25, 2019

Related U.S. Application Data

(60) Provisional application No. 62/316,287, filed on Mar. 31, 2016.

(51) Int. Cl.
*H04L 5/00*    (2006.01)
*H04L 25/02*    (2006.01)

(52) U.S. Cl.
CPC ........ *H04L 5/0048* (2013.01); *H04L 25/0224* (2013.01)

(58) Field of Classification Search
CPC .................. H04L 5/0048; H04L 25/0224
See application file for complete search history.

(56) References Cited

U.S. PATENT DOCUMENTS

2013/0343299 A1* 12/2013 Sayana ............... H04B 7/024
 370/329
2014/0036796 A1* 2/2014 Etemad ............. H04W 40/246
 370/329

(Continued)

FOREIGN PATENT DOCUMENTS

CN    107431574 A    12/2017
EP    2677801 A1    12/2013

(Continued)

OTHER PUBLICATIONS

International Search Report issued in corresponding Application No. PCT/US2017/025450, dated Jul. 14, 2017 (6 pages).

(Continued)

*Primary Examiner* — Kevin M Cunningham
(74) *Attorney, Agent, or Firm* — Osha Bergman Watanabe & Burton LLP

(57) ABSTRACT

A method of aperiodic signal transmission from a base station (BS) to a user equipment (UE) includes transmitting, from the BS to the UE, reservation information indicating first resources reserved for aperiodic signal transmission via higher layer signaling, transmitting, from the BS to the UE, Downlink Control Information (DCI) indicating at least a second resource to be selected based on the first resources, and transmitting, from the BS to the UE, the aperiodic signals using the first resources.

13 Claims, 23 Drawing Sheets

(56) References Cited

U.S. PATENT DOCUMENTS

| | | | |
|---|---|---|---|
| 2014/0092760 A1* | 4/2014 | Geirhofer | H04W 72/042 |
| | | | 370/252 |
| 2014/0198751 A1* | 7/2014 | Prasad | H04B 7/024 |
| | | | 370/329 |
| 2015/0146644 A1* | 5/2015 | Kim | H04L 5/0048 |
| | | | 370/329 |
| 2015/0162966 A1* | 6/2015 | Kim | H04L 1/20 |
| | | | 370/252 |
| 2016/0029238 A1 | 1/2016 | Chen et al. | |
| 2016/0227548 A1* | 8/2016 | Nimbalker | H04W 72/042 |
| 2018/0175983 A1* | 6/2018 | Yum | H04L 5/0057 |

FOREIGN PATENT DOCUMENTS

| | | |
|---|---|---|
| EP | 2869478 A1 | 5/2015 |
| EP | 2966931 A1 | 1/2016 |
| JP | 201493620 A | 5/2014 |
| JP | 201570336 A | 4/2015 |
| WO | 2016025262 A1 | 2/2016 |

OTHER PUBLICATIONS

Written Opinion issued in corresponding Application No. PCT/US2017/025450, dated Jul. 14, 2017 (7 pages).

3GPP TS 36.211 V12.6.0, Release 12; Section 5; Jun. 2015 (44 pages).

3GPP TS 36.213 V12.5.0; "3rd Generation Partnership Project; Technical Specification Group Radio Access Network; Evolved Universal Terrestrial Radio Access (E-UTRA); Physical layer procedures (Release 12)"; Mar. 2015 (239 pages).

Zte; "Specification Impacts of Beamformed CSI-RS Configuration" 3GPP TSG RAN WG1 Meeting #82, R1-154743; Beijing, China, Aug. 24-28, 2015 (6 pages).

Samsung; "Discussion on aperiodic CSI-RS resource configuration" 3GPP TSG RAN WG1 Meeting #83, R1-156784; Anaheim, USA, Nov. 15-22, 2015 (3 pages).

Ericsson; "On CSI Measurement and Reporting for LAA"; 3GPP TSG RAN WG1 Meeting #82bis, R1-156050; Malmo, Sweden, Oct. 5-9, 2015 (4 pages).

Office Action issued in Japanese Application No. 2018-551357; dated Sep. 17, 2019 (16 pages).

Office Action issued in the counterpart European Patent Application No. 17719396.8, dated Aug. 7, 2020 (8 pages).

Office Action issued in the counterpart Chinese Patent Application No. 201780031171.2, dated Sep. 9, 2020 (23 pages).

Office Action issued in counterpart Japanese Application No. 2020-160357 dated Sep. 21, 2021 (11 pages).

Office Action issued in European Application No. 17 719 396.8 dated Nov. 4, 2021 (7 pages).

* cited by examiner

FIG. 3A

Mapping from CSI-RS configuration to $(k', l')$ for normal cyclic prefix

| | CSI-RS configuration | Number of CSI reference signals configured | | | | | |
|---|---|---|---|---|---|---|---|
| | | 1 or 2 | | 4 | | 8 | |
| | | $(k',l')$ | $n_s \bmod 2$ | $(k',l')$ | $n_s \bmod 2$ | $(k',l')$ | $n_s \bmod 2$ |
| Frame structure type 1 and 2 | 0 | (9,5) | 0 | (9,5) | 0 | (9,5) | 0 |
| | 1 | (11,2) | 1 | (11,2) | 1 | (11,2) | 1 |
| | 2 | (9,2) | 1 | (9,2) | 1 | (9,2) | 1 |
| | 3 | (7,2) | 1 | (7,2) | 1 | (7,2) | 1 |
| | 4 | (9,5) | 1 | (9,5) | 1 | (9,5) | 1 |
| | 5 | (8,5) | 0 | (8,5) | 0 | | |
| | 6 | (10,2) | 1 | (10,2) | 1 | | |
| | 7 | (8,2) | 1 | (8,2) | 1 | | |
| | 8 | (6,2) | 1 | (6,2) | 1 | | |
| | 9 | (8,5) | 1 | (8,5) | 1 | | |
| | 10 | (3,5) | 0 | | | | |
| | 11 | (2,5) | 0 | | | | |
| | 12 | (5,2) | 1 | | | | |
| | 13 | (4,2) | 1 | | | | |
| | 14 | (3,2) | 1 | | | | |
| | 15 | (2,2) | 1 | | | | |
| | 16 | (1,2) | 1 | | | | |
| | 17 | (0,2) | 1 | | | | |
| | 18 | (3,5) | 1 | | | | |
| | 19 | (2,5) | 1 | | | | |
| Frame structure type 2 only | 20 | (11,1) | 1 | (11,1) | 1 | (11,1) | 1 |
| | 21 | (9,1) | 1 | (9,1) | 1 | (9,1) | 1 |
| | 22 | (7,1) | 1 | (7,1) | 1 | (7,1) | 1 |
| | 23 | (10,1) | 1 | (10,1) | 1 | | |
| | 24 | (8,1) | 1 | (8,1) | 1 | | |
| | 25 | (6,1) | 1 | (6,1) | 1 | | |
| | 26 | (5,1) | 1 | | | | |
| | 27 | (4,1) | 1 | | | | |
| | 28 | (3,1) | 1 | | | | |
| | 29 | (2,1) | 1 | | | | |
| | 30 | (1,1) | 1 | | | | |
| | 31 | (0,1) | 1 | | | | |

FIG. 3B

Mapping from CSI reference signal configuration to $(k', l')$ for extended cyclic prefix

| | CSI-RS configuration | Number of CSI-RSs configured | | | | | |
|---|---|---|---|---|---|---|---|
| | | 1 or 2 | | 4 | | 8 | |
| | | $(k',l')$ | $n_s \mod 2$ | $(k',l')$ | $n_s \mod 2$ | $(k',l')$ | $n_s \mod 2$ |
| Frame structure type 1 and 2 | 0 | (11,4) | 0 | (11,4) | 0 | (11,4) | 0 |
| | 1 | (9,4) | 0 | (9,4) | 0 | (9,4) | 0 |
| | 2 | (10,4) | 1 | (10,4) | 1 | (10,4) | 1 |
| | 3 | (9,4) | 1 | (9,4) | 1 | (9,4) | 1 |
| | 4 | (5,4) | 0 | (5,4) | 0 | | |
| | 5 | (3,4) | 0 | (3,4) | 0 | | |
| | 6 | (4,4) | 1 | (4,4) | 1 | | |
| | 7 | (3,4) | 1 | (3,4) | 1 | | |
| | 8 | (8,4) | 0 | | | | |
| | 9 | (6,4) | 0 | | | | |
| | 10 | (2,4) | 0 | | | | |
| | 11 | (0,4) | 0 | | | | |
| | 12 | (7,4) | 1 | | | | |
| | 13 | (6,4) | 1 | | | | |
| | 14 | (1,4) | 1 | | | | |
| | 15 | (0,4) | 1 | | | | |
| Frame structure type 2 only | 16 | (11,1) | 1 | (11,1) | 1 | (11,1) | 1 |
| | 17 | (10,1) | 1 | (10,1) | 1 | (10,1) | 1 |
| | 18 | (9,1) | 1 | (9,1) | 1 | (9,1) | 1 |
| | 19 | (5,1) | 1 | (5,1) | 1 | | |
| | 20 | (4,1) | 1 | (4,1) | 1 | | |
| | 21 | (3,1) | 1 | (3,1) | 1 | | |
| | 22 | (8,1) | 1 | | | | |
| | 23 | (7,1) | 1 | | | | |
| | 24 | (6,1) | 1 | | | | |
| | 25 | (2,1) | 1 | | | | |
| | 26 | (1,1) | 1 | | | | |
| | 27 | (0,1) | 1 | | | | |

FIG. 4

| CSI-RS SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0 – 4 | 5 | $I_{CSI-RS}$ |
| 5 – 14 | 10 | $I_{CSI-RS} - 5$ |
| 15 – 34 | 20 | $I_{CSI-RS} - 15$ |
| 35 – 74 | 40 | $I_{CSI-RS} - 35$ |
| 75 – 154 | 80 | $I_{CSI-RS} - 75$ |

FIG. 8

| CSI-RS SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0 – 4 | 5 | $I_{CSI-RS}$ |
| 5 – 14 | 10 | $I_{CSI-RS} - 5$ |
| 15 – 34 | 20 | $I_{CSI-RS} - 15$ |
| 35 – 74 | 40 | $I_{CSI-RS} - 35$ |
| 75 – 154 | 80 | $I_{CSI-RS} - 75$ |
| 155 | 1 | $I_{CSI-RS} - 1$ |
| 156-157 | 2 | $I_{CSI-RS} - 2$ |
| ⋮ | ⋮ | ⋮ |

FIG. 15

|  |  | ZP CSI-RS (IMR) | |
|---|---|---|---|
|  |  | Periodic | Aperiodic |
| NZP CSI-RS | Periodic | Alt. 1A | Alt. 1B |
|  | Aperiodic | Alt. 2A | Alt. 2B |

Alt. 1A: CSI Calculation Using Periodic NZP CSI-RS and Periodic ZP CSI-RS

Alt. 1B: CSI Calculation Using Periodic NZP CSI-RS and Aperiodic ZP CSI-RS

Alt. 2A: CSI Calculation Using Aperiodic NZP CSI-RS and Periodic ZP CSI-RS

Alt. 2B: CSI Calculation Using Aperiodic NZP CSI-RS and Aperiodic ZP CSI-RS

FIG. 16

|  |  | CSI Reporting | |
|---|---|---|---|
|  |  | Periodic | Aperiodic |
| CSI-RS Transmission | Periodic | Alt. 3A | Alt. 3B |
|  | Aperiodic | Alt. 4A | Alt. 4B |

Alt. 3A: Periodic CSI Reporting Based On Periodic CSI-RS Transmission

Alt. 3B: Aperiodic CSI Reporting Based On Periodic CSI-RS Transmission

Alt. 4A: Periodic CSI Reporting Based On Aperiodic CSI-RS Transmission

Alt. 4B: Aperiodic CSI Reporting Based On Aperiodic CSI-RS Transmission

METHOD OF APERIODIC SIGNAL TRANSMISSION, BASE STATION, AND USER EQUIPMENT

TECHNICAL FIELD

The present invention relates generally to a method of aperiodic signal transmission in a wireless communication system including a base station (BS) and a user equipment (UE) and, more particularly, to methods of aperiodic Zero Power Channel State Information-Reference Signal (ZP CSI-RS) transmission and aperiodic Interference Measurement Resource (IMR) transmission.

BACKGROUND ART

In Third Generation Partnership Project (3GPP), three dimensional (3D) Multiple Input Multiple Output (MIMO) technology is being studied under Long Term Evolution (LTE) Release 13. 3D MIMO technology is capable of transmission beam control in 3D using a 3D MIMO antenna, in which antenna elements are arranged either in vertical and horizontal two dimensional (2D) planes or in 3D space.

In the 3GPP standard, 3D MIMO is classified as Elevation beamforming (BF) or Full Dimension (FD)-MIMO according to the number of antenna ports. 3D MIMO using eight or less antenna ports is sometimes classified as Elevation beamforming, and 3D MIMO using more than eight antenna ports is sometimes classified as FD-MIMO. FD-MIMO is also called Massive MIMO, which is being discussed as a key technology for New Radio (NR) (Fifth Generation (5G)) system.

In Massive MIMO technology, Channel State Information Reference Signal (CSI-RS) for acquiring Channel State Information (CSI) may be used to maintain CSI-RS coverage. However, using CSI-RS transmission to cover an entire cell may cause a large amount of CSI-RS overhead. To avoid such overhead, CSI-RS may be transmitted only towards active user equipment (UE) (UE-specific CSI-RS).

On the other hand, in conventional LTE systems (e.g., Release 10, 11, and 12), CSI-RSs are transmitted periodically (e.g., every 5 ms) and typically shared among UEs in a single cell. FIG. 1 is a diagram showing subframe configurations of LTE Release 12 and 13, respectively. In LTE Release 12, each UE can receive CSI-RS and PDSCH (data) considering higher layer configured CSI-RS information. More specifically, PDSCH is decoded at the UE considering whether CSI-RS is multiplexed to particular subframe. In Release 13, as shown in FIG. 1, CSI-RSs can be transmitted aperiodically (aperiodic CSI-RS or aperiodic Non-Zero Power (NZP) CSI-RS). Aperiodic CSI-RS is transmitted as necessary to reduce CSI-RS overhead in 3GPP. The UE-specific CSI-RS applying aperiodic CSI-RS transmission may help reduce CSI-RS overhead effectively.

However, the conventional LTE standard does not define aperiodic Zero Power (ZP) CSI-RS transmission and aperiodic Interference Measurement Resource (IMR) transmission schemes in addition to a NZP CSI-RS transmission scheme. For example, UEs are not capable of identifying the resource on which the aperiodic ZP CSI-RS or the aperiodic IMR is multiplexed. As a result, the UEs do not perform a rate matching process, which in turn adversely affects data transmission quality.

CITATION LIST

Non-Patent Reference

[Non-Patent Reference 1] 3GPP, TS 36.211 V 12.6.0
[Non-Patent Reference 2] 3GPP, TS 36.213 V 12.5.0

SUMMARY OF THE INVENTION

According to one or more embodiments of the present invention, a method of aperiodic signal transmission from a base station (BS) to a user equipment (UE) may comprise transmitting, from the BS to the UE, reservation information indicating first resources reserved for aperiodic signal transmission via higher layer signaling, transmitting, from the BS to the UE, Downlink Control Information (DCI) indicating at least a second resource to be selected based on the first resources, and transmitting, from the BS to the UE, the aperiodic signals using the first resources.

In a method of aperiodic signal transmission according to the one or more embodiments of the present invention, the aperiodic signal may be an aperiodic Zero Power (ZP) Channel State Information Reference Signal (CSI-RS).

In a method of aperiodic signal transmission according to the one or more embodiments of the present invention, the aperiodic signal may be an aperiodic Interference Measurement Resource (IMR).

According to one or more embodiments of the present invention, a BS may comprise a transmitter that transmits, to a UE, reservation information indicating first resources reserved for aperiodic signal transmission via higher layer signaling, DCI indicating at least a second resource to be selected based on the first resources, and the aperiodic signals using the first resources.

According to one or more embodiments of the present invention, a UE may comprise a receiver that receives, from a BS, reservation information indicating first resources reserved for aperiodic signal transmission via higher layer signaling, DCI indicating at least a second resource to be selected based on the first resources, and a processor that selects the second resource based on the first resources with the DCI. The receiver may receive the aperiodic signal transmitted from the BS using the second resource.

One or more embodiments of the present invention provides a method that can cause a BS and a UE to transmit and receive aperiodic signals properly.

BRIEF DESCRIPTION OF THE DRAWINGS

FIG. 3A is a diagram showing mapping from a CSI-RS configuration to REs for a normal cyclic prefix according to one or more embodiments of the present invention.

FIG. 3B is a diagram showing mapping from a CSI-RS configuration to REs for an extended cyclic prefix according to one or more embodiments of the present invention.

FIG. 4 is a diagram showing a CSI-RS subframe configuration according to one or more embodiments of the present invention.

FIG. 8 is a diagram showing a CSI-RS subframe configuration according to one or more embodiments of another example of the first example of the present invention.

FIG. 15 is a table showing a CSI calculation scheme according to one or more embodiments of a fifth example of the present invention.

FIG. 16 is a table showing a CSI reporting scheme based on periodic/aperiodic CSI-RS transmission according to one or more embodiments of a sixth example of the present invention.

DETAILED DESCRIPTION OF EMBODIMENTS

Embodiments of the present invention will be described in detail below, with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Channel State Information Reference Signal (CSI-RS) transmitted from a base station (BS) to user equipment (UE) in accordance with one or more embodiments will be described below, with reference to FIGS. 2, 3A, 3B, and 4.

Figure 2:
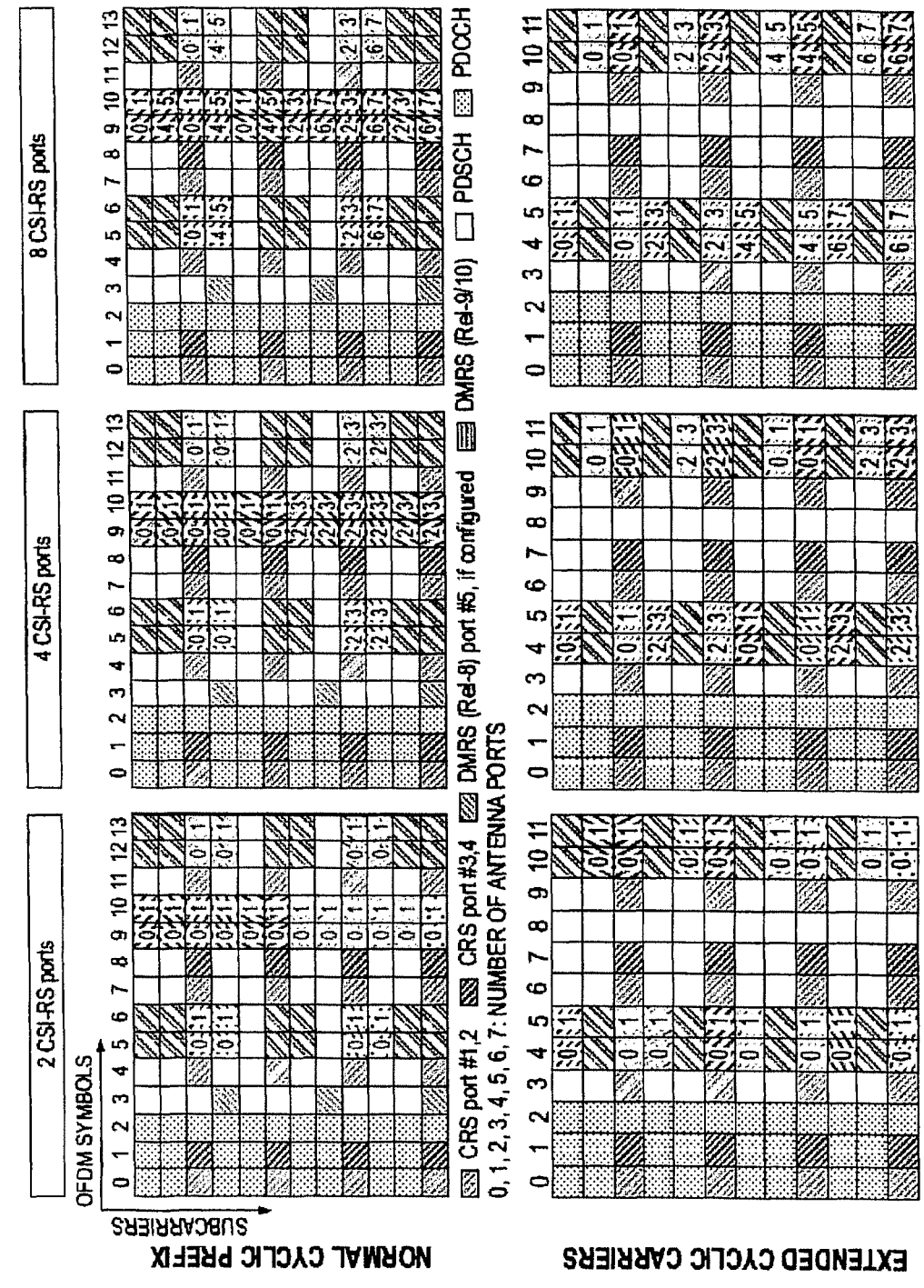
FIG. 2 is a diagram showing resource elements (REs) allocated to the CSI-RS antenna ports in a resource block (RB) according to one or more embodiments of the present invention.

FIG. 2 is a diagram showing resource elements (REs) allocated to antenna ports for CSI-RS transmission (CSI-RS antenna ports) in a resource block (RB) for a normal cyclic prefix and an extended cyclic prefix according to one or more embodiments of the present invention. As shown in FIG. 2, one axis designates Orthogonal Frequency Division Multiplexing (OFDM) symbols and the other axis designates subcarriers. Each block corresponds to the RE in the RB and the hatched REs with the number of antenna ports are allocated to the CSI-RS antenna ports. Furthermore, as shown in FIG. 2, two REs are allocated to the CSI-RS antenna ports when the BS designates two CSI-RS antenna ports. Moreover, four REs are allocated to the CSI-RS antenna ports when the BS designates four CSI-RS antenna ports, and eight REs are allocated to the CSI-RS antenna ports when the BS designates eight CSI-RS antenna ports.

FIGS. 3A and 3B show mapping from a CSI-RS configuration to REs for the normal cyclic prefix and the extended cyclic prefix, respectively, according to one or more embodiments of the present invention. The tables (CSI-RS configuration) as shown in FIGS. 3A and 3B are used to report, to the UE, mapping of CSI-RS to REs in the RB. The table (CSI-RS configuration) in FIGS. 3A and 3B is defined in Table 6.10.5.2-1 and 6.10.5.2-1 respectively of the 3GPP TS 36.211.

For example, when mapping two CSI-RS antenna ports for the normal cycle prefix as shown in FIG. 2, twenty pairs of REs allocated to the CSI-RS antenna ports are indicated. FIG. 3A shows a table corresponding to frame structure type 1 and 2 including indexes 0-19 for a CSI-RS configuration (mapping information). The BS transmits to the UE one of the indexes 0-19 for a CSI-RS configuration in FIG. 3A to report which one of the twenty pairs of REs allocated to the CSI-RS antenna ports in FIG. 2 is used.

FIG. 4 shows a CSI-RS subframe configuration according to one or more embodiments of the present invention. The table (CSI-RS subframe configuration) as shown in FIG. 4 is used for reporting to the UE a CSI-RS transmission periodicity (periodic CSI-RS) and a CSI-RS subframe offset. The CSI-RS subframe offset defines an initial subframe index. The table (CSI-RS subframe configuration) in FIG. 4 is defined in Table 6.10.5.3-1 of the 3GPP TS 36.211.

The BS multiplexes the CSI-RS designated using the table (CSI-RS configuration) of FIGS. 3A and 3B on the subframe, and transmits the multiplexed CSI-RS to the UE at the CSI-RS transmission periodicity (e.g., 5, 10, 20, 40 or 80). The BS transmits one of the indexes 0-154 for CSI-RS-SubframeConfig $I_{CSI-RS}$ (CSI-RS subframe configuration) in FIG. 4 to the UE for reporting the CSI-RS transmission periodicity and the CSI-RS subframe offset defining the initial subframe index.

The current LTE standard (e.g., LTE Release 12) does not define how to transmit and receive aperiodic Non-Zero Power (NZP) CSI-RS, aperiodic Zero Power CSI-RS (ZP CSI-RS), and aperiodic Interference Measurement Resource (IMR), but embodiments of the present invention provide a way to transmit and receive the aperiodic NZP CSI-RS, aperiodic ZP CSI-RS, and aperiodic IMR. In one or more embodiments of the present invention, operation examples of the aperiodic CSI-RS transmission scheme may be applied to not only the aperiodic NZP CSI-RS transmission but also the aperiodic ZP CSI-RS and IMR transmission schemes. Embodiments of the present invention will be described as a wireless communication system applying CSI-RS transmission, by way of example. The wireless communication system is not limited to the specific configurations described herein and may be any type of wireless communication system applying CSI-RS transmission. In one or more embodiments of the present invention, the aperiodic NZP CSI-RS may be beamformed.

System Configuration

A wireless communication system 1 according to one or more embodiments of the present invention will be described below with reference to FIG. 5.

Figure 5:
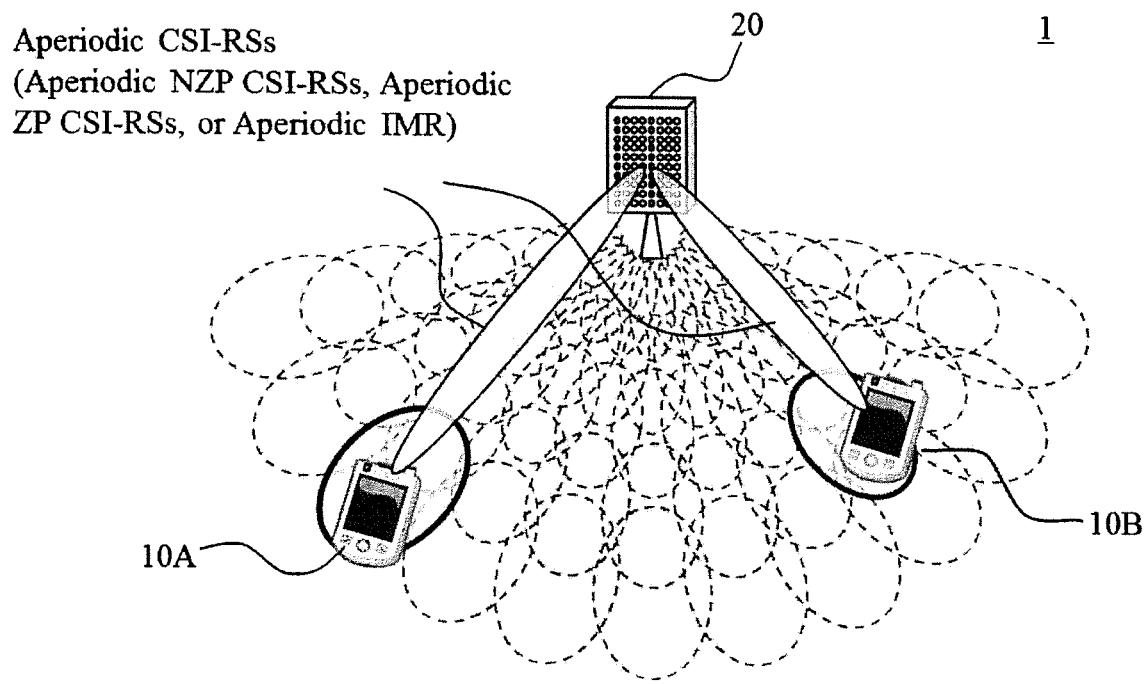
FIG. 5 is a diagram showing a configuration of a wireless communication system according to one or more embodiments of the present invention.

As shown in FIG. 5, the wireless communication system 1 comprises a UE 10 (UE 10A and UE 10B), a BS 20. The wireless communication system 1 is a MIMO system under the LTE standard. For example, the wireless communication system 1 may be a New Radio system or an LTE/LTE-Advanced (LTE-A) system. The wireless communication system 1 may be any wireless communication system supporting the (2D or 3D) MIMO communication using multiple antenna ports.

The BS 20 communicates with the UE 10 via multiple antenna ports using a MIMO technology. The BS 20 may be gNodeB (gNB) or Evolved NodeB (eNB). The BS 20 performs radio communication with the UE 10 via multiple antenna ports in a multi-dimensional antenna provided with the BS 20, such as a 2D planar antenna or a 3D antenna. The BS 20 receives downlink packets from a network equipment such as upper nodes or servers connected on a core network via the access gateway apparatus, and transmits the downlink packets to the UE 10 via the multiple antenna ports. The BS 20 receives uplink packets from the UE 10 and transmits the uplink packets to the network equipment via the multiple antenna ports.

The BS 20 includes an antenna for 3D MIMO to transmit radio signals between the UE 10, a communication interface to communicate with an adjacent BS 20 (for example, X2 interface), a communication interface to communicate with the core network (for example, S1 interface), and a CPU (Central Processing Unit) such as a processor or a circuit to process transmitted and received signals with the UE 10. Functions and processing of the BS 20 described below may be implemented by the processor processing or executing data and programs stored in a memory. However, the BS 20 is not limited to the hardware configuration set forth above and may include any appropriate hardware configurations. Generally, a number of the BSs 20 are disposed so as to cover a broader service area of the wireless communication system 1.

The BS 20 may transmit aperiodic CSI-RSs (e.g., aperiodic NZP CSI-RS, aperiodic ZP CSI-RS, and aperiodic IMR). The BS may transmit CSI-RS periodically every 5, 10, 20, 40, or 80 ms in addition to the aperiodic CSI-RS transmission.

The UE 10 communicates with the base station 20 using 3D MIMO technology. The UE 10 transmits and receives radio signals such as data signals and control signals between the base station 20 and the UE 10 via one or multiple antenna ports of the UE 10. The UE 10 may be a mobile station, a smartphone, a cellular phone, a tablet, a mobile router, or information processing apparatus having a radio communication function such as a wearable device.

The UE 10 includes a CPU such as a processor, a RAM (Random Access Memory), a flash memory, and a radio communication device to transmit/receive radio signals to/from the BS 20 and the UE 10. For example, functions and processing of the UE 10 described below may be implemented by the CPU processing or executing data and programs stored in a memory. However, the UE 10 is not limited to the hardware configuration set forth above and may be configured with, e.g., a circuit to achieve the processing described below.

First Example

According to one or more embodiments of a first example of the present invention, the BS 20 may reserve resources (first resources) for the aperiodic CSI-RS (aperiodic NZP CSI-RSs, aperiodic ZP CSI-RSs, or aperiodic IMR) transmission semi-statically. The resources for the aperiodic CSI-RS transmission is resources (REs) mapped to the antenna ports for the aperiodic CSI-RS transmission.

CSI-RS Subframe Configuration (1)

Figure 6:
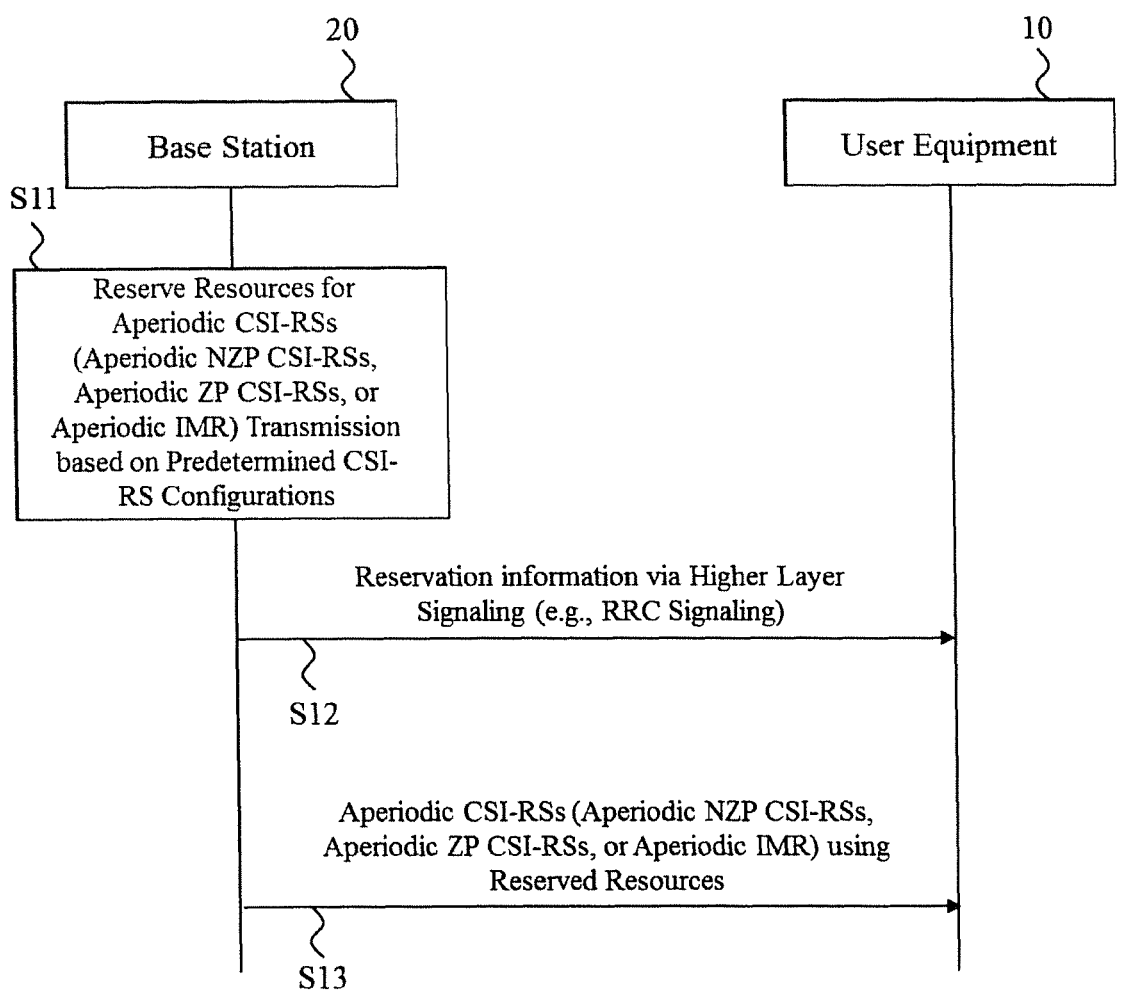
FIG. 6 is a sequence diagram showing aperiodic CSI-RS transmission according to one or more embodiments of a first example of the present invention.

FIG. 6 is a sequence diagram showing CSI-RS transmission according to one or more embodiments of the first example of the present invention. As shown in FIG. 6, the BS 20 may reserve resources for aperiodic CSI-RSs (e.g., aperiodic NZP CSI-RSs, aperiodic ZP CSI-RSs, or aperiodic IMR) transmission based on predetermined CSI-RS configurations (step S11). The predetermined CSI-RS configuration may be CSI-RS configuration indicated in Table 6.10.5.3-1 of the 3GPP TS 36.211. For example, the BS 20 may designate an index of the CSI-RS configuration based on CSI-RS configurations indicated in Table 6.10.5.3-1 of the 3GPP TS 36.211. For example, the resources for aperiodic CSI-RSs may be reserved for each of the subframes. For example, the BS 20 may reserve the resources for aperiodic CSI-RSs without the CSI-RS-SubframeConfig $I_{CSI\text{-}RS}$ (CSI-RS subframe configuration or subframe configuration ID). As another example, for example, the BS 20 may reserve resources for the aperiodic CSI-RS transmission using conventional Synchronization Signal (SS)/Reference Signal (RS) configurations. For example, the resources may be reserved using a Demodulation-Reference Signal (DM-RS) configuration including information indicating the number of antenna ports, the number of layers, scrambling, code-division multiplexing (CDM), and/or time/frequency position for the aperiodic CSI-RS transmission. As another example, for example, the BS 20 may reserve resources for the aperiodic CSI-RS transmission with group(s) of time/frequency resources, e.g., REs, which may be newly defined.

The BS 20 may transmit reservation information indicating the reserved resources via higher layer signaling such as Radio Resource Control (RRC) signaling to the UE 10 (step S12).

The BS 20 may transmit aperiodic CSI-RSs (e.g., aperiodic NZP CSI-RSs, aperiodic ZP CSI-RSs, or aperiodic IMR) to the UE 10 (step S13).

For example, when the UE 10 receives the aperiodic NZP CSI-RSs and/or aperiodic IMR, the UE 10 may perform aperiodic CSI reporting based on the received aperiodic NZP CSI-RSs and/or aperiodic IMR. The CSI feedback may include existing CSI, such as rank indicator (RI), precoding matrix index (PMI) and channel quality information (CQI).

As another implementation, the CSI may be newly defined one such as beam index (BI) for beam selection.

CSI-RS Subframe Configuration (2)

Figure 7:
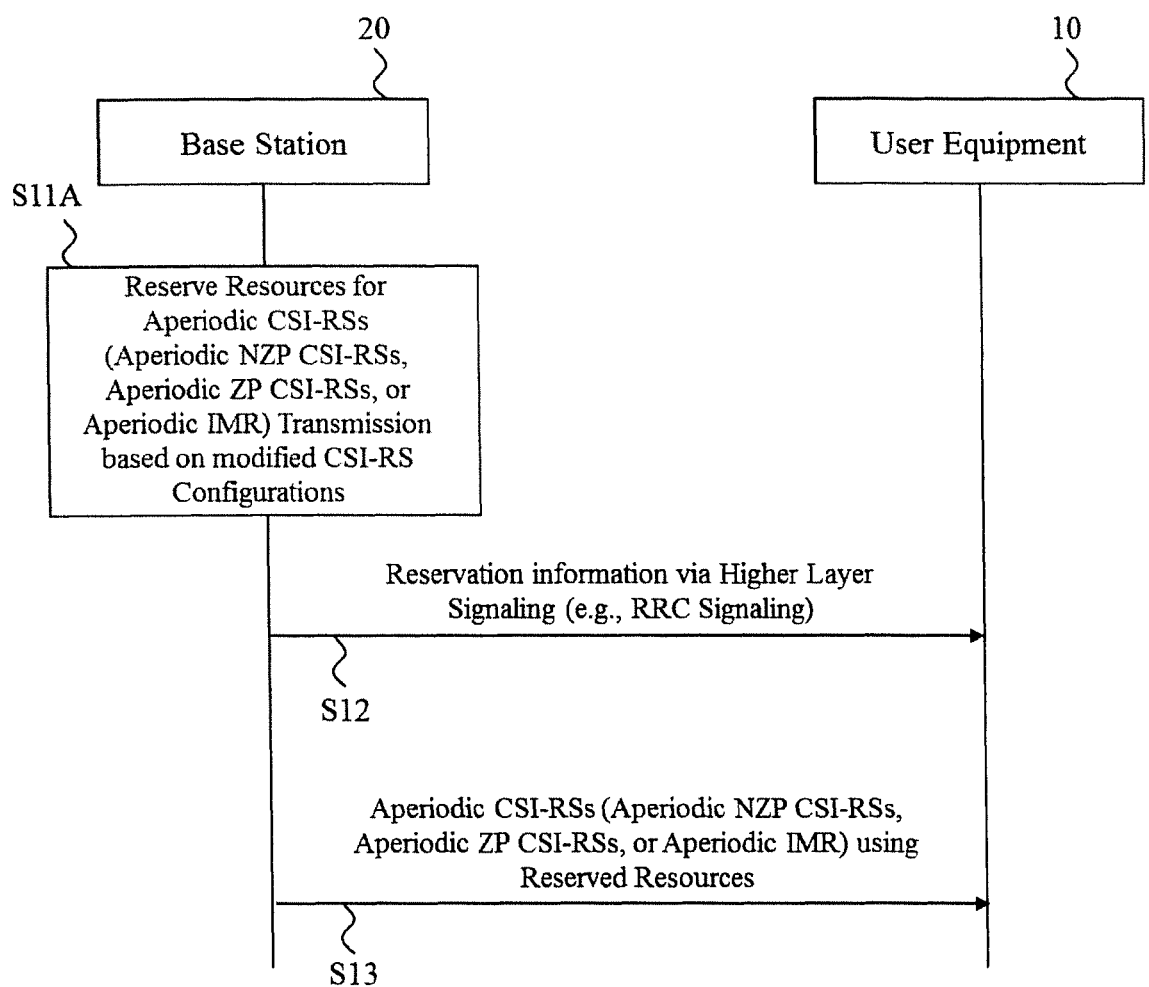
FIG. 7 is a sequence diagram showing aperiodic CSI-RS transmission according to one or more embodiments of the first example of the present invention.

According to one or more embodiments of a modified first example of the present invention, the BS 20 may reserve resources for the aperiodic CSI-RS based on a modified Table 6.10.5.3-1 of the 3GPP TS 36.211 (step S11A). For example, the BS 20 may designate an index of the CSI-RS Subframe Configuration using the modified Table. Steps S12-S14 of FIG. 7 correspond to steps S12-S14 of FIG. 6.

FIG. 8 shows the modified table according to one or more embodiments of the modified first example. For example, in the modified table in FIG. 8, indexes 155, 156 and 157 of CSI-RS-SubframeConfig $I_{CSI-RS}$ (CSI-RS subframe configuration) may be added to the conventional table in FIG. 4 defined in Table 6.10.5.3-1 of the 3GPP TS 36.211. For example, CSI-RS-SubframeConfig $I_{CSI-RS}$ "155", "156" and "157" are associated with CSI-RS transmission periodicity "1" and "2" and the CSI-RS subframe offset "$I_{CSI-RS}$-1" and "$I_{CSI-RS}$-2", respectively. That is, the modified table that secures CSI-RS subframe resources in high density may increase CSI-RS subframe transmission opportunity. The modification can be also beneficial when the CSI-RS resource is shared with multiple UEs and more resource is required compared to the legacy CSI-RS subframe configuration. As a result, for example, in aperiodic CSI-RS transmission, when the BS 20 designates CSI-RS-SubframeConfig $I_{CSI-RS}$ "155" and then transmits CSI-RS-SubframeConfig $I_{CSI-RS}$ "155" to the UE 10, the UE 10 can specify a subframe including CSI-RS (CSI-RS subframe) in subframes transmitted from the BS 20 because the UE 10 recognizes the CSI-RS transmission periodicity is "1 ms". The modified table may be Table 6.10.5.3-1 without some of the indexes (rows) so as to increase CSI-RS subframe transmission opportunity relatively. Here, the modified table can be also applied for legacy periodic CSI-RS.

When the modified table above is used for CSI-RS transmission, Physical Downlink Shared Channel (PDSCH) muting should be performed at every one or two subframes. That is, duty cycle/subframe offset of a muting subframe configuration may include the subframe of which transmission periodicity is one or two subframe (ms).

Resource Allocation

When the BS 20 transmits aperiodic CSI-RS, the BS 20 may determine a location where the CSI-RS is mapped to at least a portion of REs in the RB per subframe based on the conventional table (CSI-RS configuration) defined in Table 6.10.5.2-1 or 6.10.5.2-2, as shown in FIG. 3A or 3B. That is, in aperiodic CSI-RS transmission in accordance with one or more embodiments, the BS transmits to the UE one of the indexes for the CSI-RS configuration in FIG. 3A or 3B to report which one of the twenty pairs of REs allocated to the CSI-RS antenna ports is used.

Furthermore, the BS 20 may transmit one of the indexes for the CSI-RS configuration in FIG. 3A or 3B via higher layer signaling such as RRC signaling. One of the indexes for the CSI-RS configuration may be mapping information that indicates the location where the CSI-RS is mapped to at least a portion of REs in the RB in the CSI-RS subframe.

Modified First Example

Figure 9:
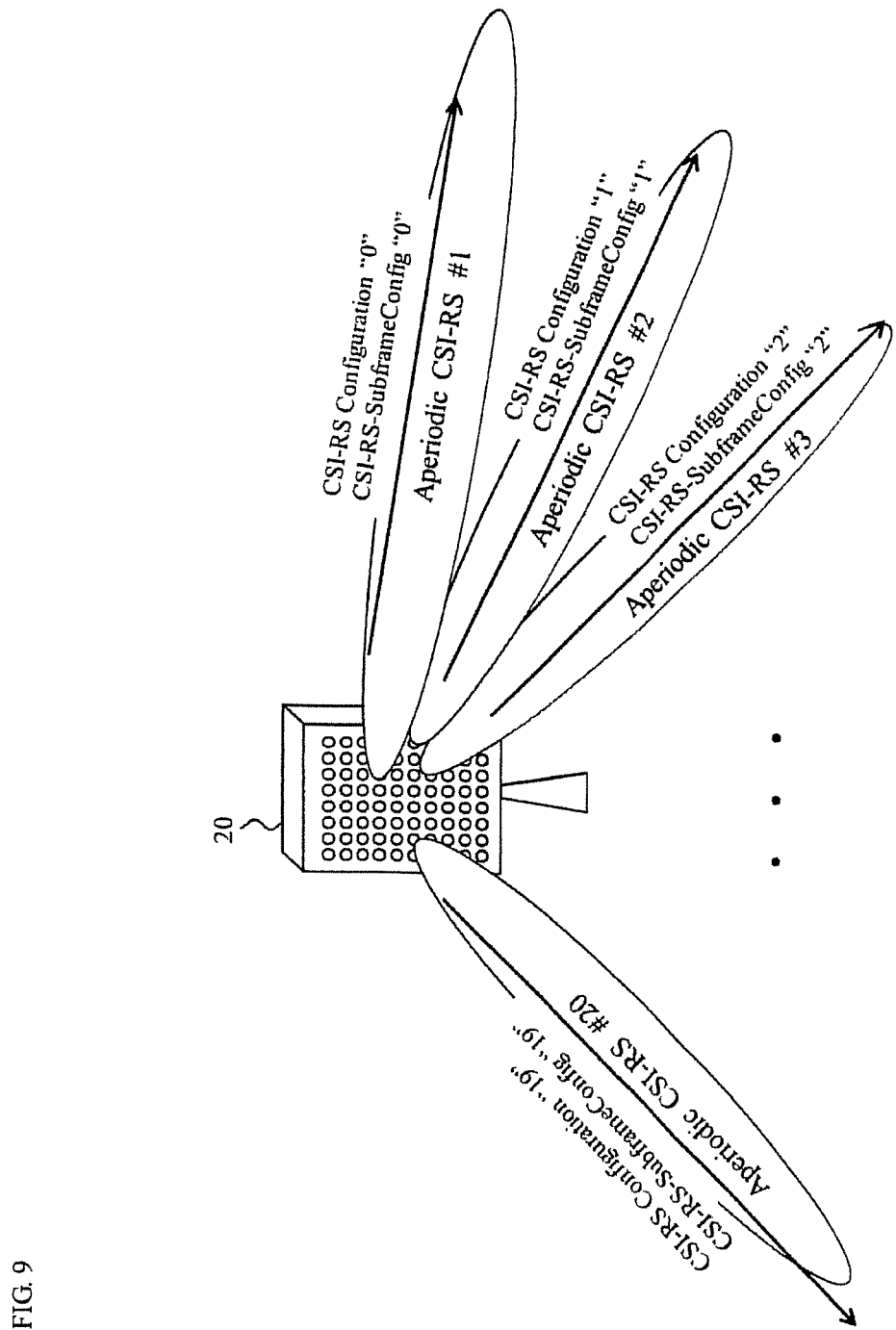
FIG. 9 is a diagram showing a CSI-RS configuration and a CSI-RS subframe configuration according to one or more embodiments of the first example of the present invention.

According to one or more embodiments of the modified first example, as shown in FIG. 9, when the BS 20 transmits aperiodic CSI-RSs (e.g., #1-20), the BS 20 may determine the CSI-RS configuration and the CSI-RS subframe configuration (CSI-RS-SubframeConfig) for aperiodic CSI-RSs, respectively. For example, the BS 20 may determine the CSI-RS configuration index "0" and the CSI-RS subframe configuration index "0" for aperiodic CSI-RS #1. The BS 20 may determine the CSI-RS configuration index "1" and the CSI-RS subframe configuration index "1" for aperiodic CSI-RS #2.

Figure 10:
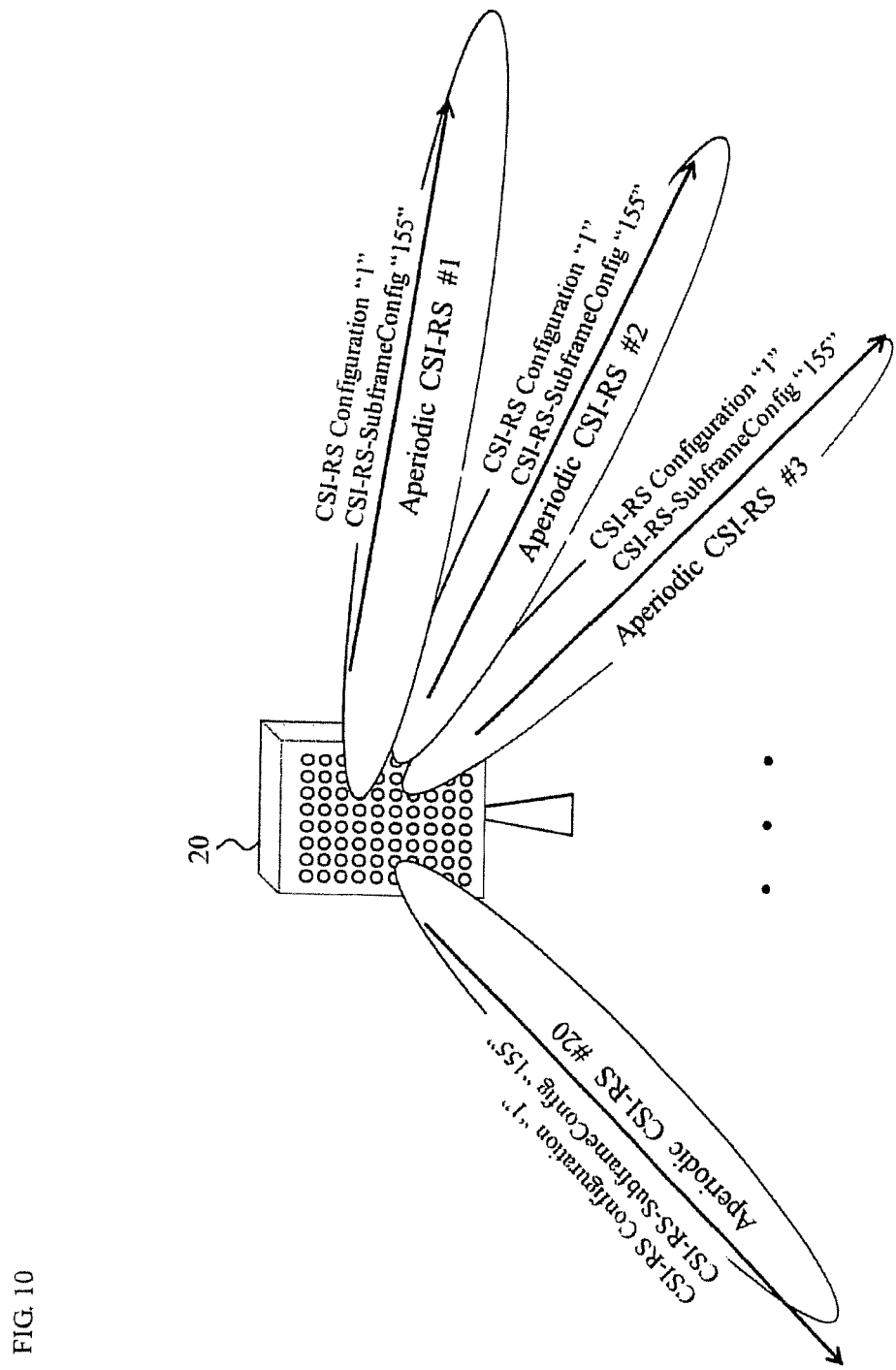
FIG. 10 is a diagram showing a CSI-RS configuration and a CSI-RS subframe configuration according to one or more embodiments of the first example of the present invention.

According to one or more embodiments of the modified first example, as shown in FIG. 10, when the BS 20 transmits aperiodic CSI-RSs (e.g., #1-20) that are time-multiplexed, the BS 20 may determine the CSI-RS configuration and the CSI-RS subframe configuration (CSI-RS-SubframeConfig) for aperiodic CSI-RSs so that the CSI-RS configuration and the CSI-RS subframe configuration are common. For example, the BS 20 may determine the CSI-RS configuration index "1" and the CSI-RS subframe configuration index "155" for aperiodic CSI-RS #1. The BS 20 may determine the CSI-RS configuration index "1" and the CSI-RS subframe configuration index "155" for CSI-RS #2. This makes it possible to decrease consumption of CSI-RS resources.

According to one or more embodiments of another example of the first example of the present invention, when the BS 20 may transmit aperiodic CSI-RSs, the BS 20 may determine the CSI-RS subframe configuration (CSI-RS-SubframeConfig) for aperiodic CSI-RSs so that the CSI-RS subframe configuration is common. The BS 20 may determine the different CSI-RS configuration for each of the plurality of aperiodic CSI-RSs in the RB. That is, the BS 20 may determine the location where the plurality of aperiodic CSI-RSs are mapped to REs in the RB in the CSI-RS subframe. According to this, it is possible to decrease consumption of CSI-RS resources.

According to one or more embodiments of the modified first example, the BS 20 may transmit information that indicates that whether the CSI-RS is the aperiodic CSI-RS, via higher layer signaling such as RRC signaling, to the UE10. The information may be transmitted via the RRC signaling used for the CSI-RS configuration and the CSI-RS subframe configuration transmission or independent RRC signaling for transmission of the information.

According to one or more embodiments of the modified first example, the BS 20 may transmit information that indicates that the CSI-RS is the aperiodic CSI-RS, UE-specific CSI-RS or cell-specific CSI-RS, or the periodic CSI-RS via higher layer signaling such as RRC signaling to the UE10.

According to one or more embodiments of the modified first example, the configuration of the aperiodic CSI-RS may use conventional higher layer signaling such as RRC information (e.g., CSI-Process, CSI-RS-Config, CSI-RS-ConfigNZP, CSI-RS-ConfigZP, or CSI-RS-IdentityNZP).

Another Example of the First Example

Figure 11:
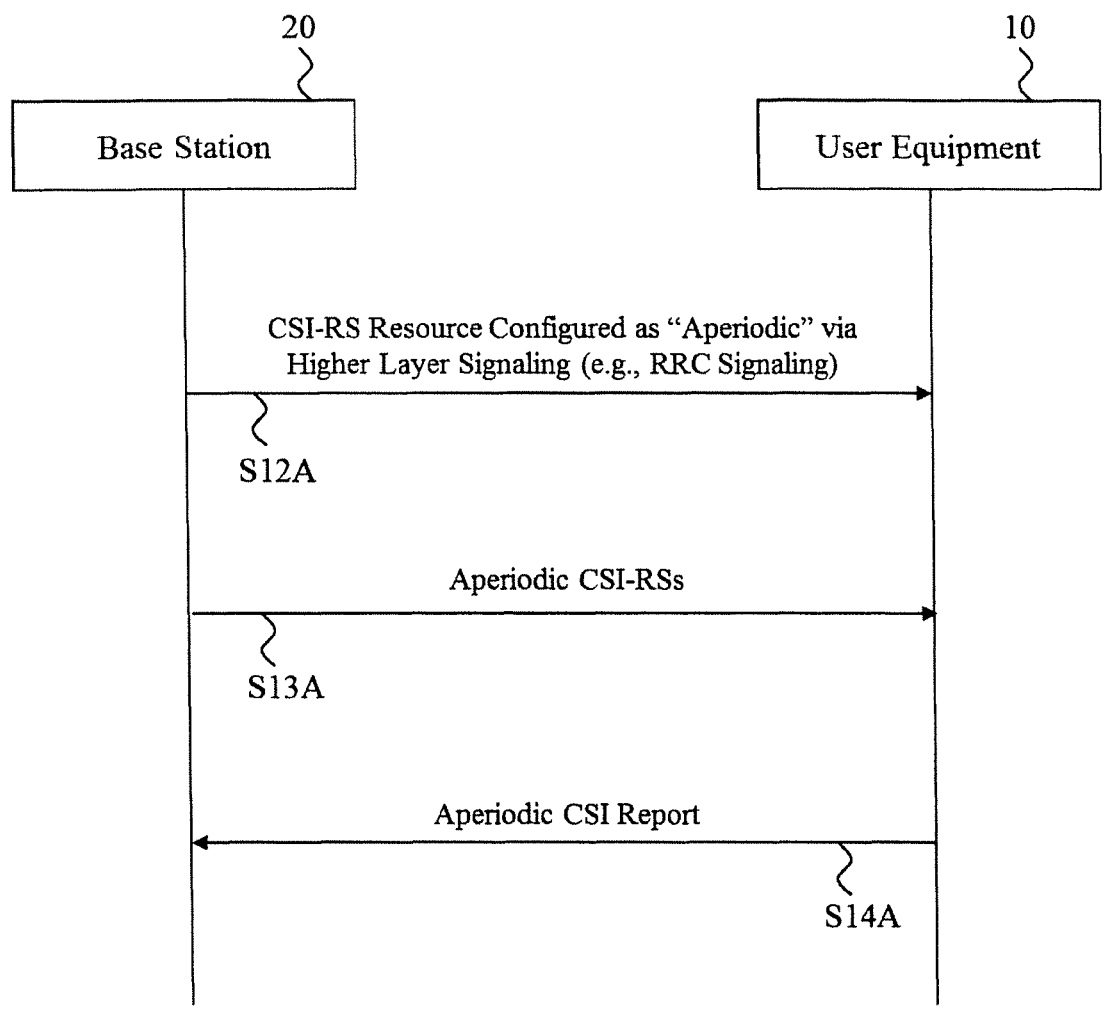
FIG. 11 is a sequence diagram showing aperiodic CSI-RS transmission according to one or more embodiments of another example of the first example of the present invention.

According to one or more embodiments of another example of the first example, when the BS 20 transmits the aperiodic CSI-RS to the UE 10, the UE 10 may only assume the aperiodic CSI reporting. For example, as shown in FIG. 11, when the UE 10 receives the CSI-RS resource configured as "aperiodic" via higher layer signaling (step S12A), the UE 10 may not assume to perform the periodic CSI reporting. The UE 10 receives the aperiodic CSI-RS (step S13A), the UE 10 may perform the aperiodic CSI reporting (step S14A). Thus, according to one or more embodiments of another example of the first example, it may be possible to reduce a load to calculate the CSI in the UE 10.

Second Example

Figure 12:
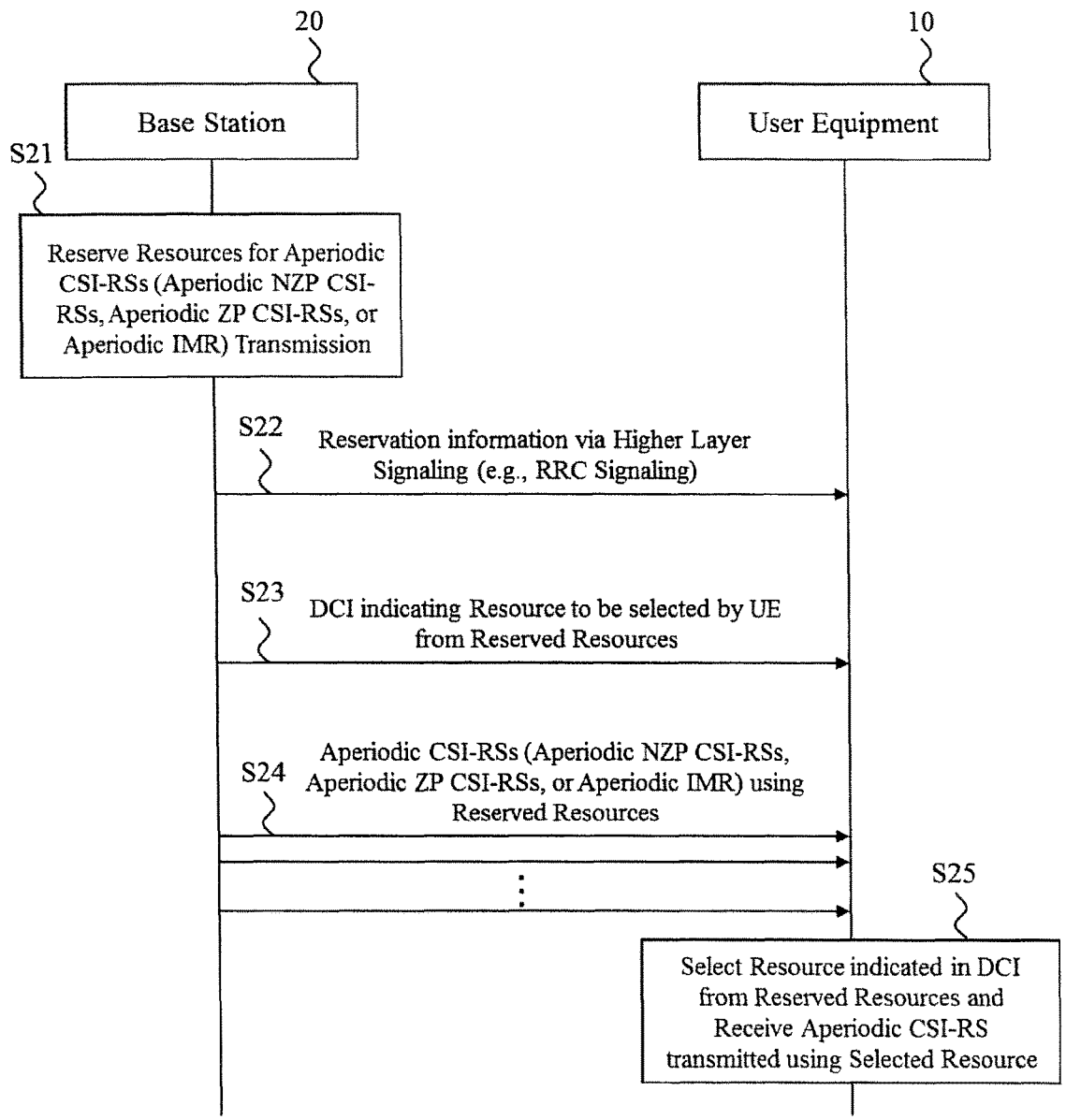
FIG. 12 is a sequence diagram showing aperiodic CSI-RS transmission according to one or more embodiments of a second example of the present invention.

Embodiments of a second example of the present invention will be described below. According to one or more embodiments of the second example, the BS 20 may reserve resources (first resources) for the aperiodic CSI-RSs (aperiodic signals) such as aperiodic NZP CSI-RSs, aperiodic ZP CSI-RSs, or aperiodic IMRs, and transmit Downlink Control Information (DCI) indicating at least a resource (second resource) to be selected based on the reserved resources (first resources). FIG. 12 is a sequence diagram showing aperiodic CSI-RS transmission according to one or more embodiments of the second example.

As shown in FIG. 12, the BS 20 may reserve resources (first resources) for aperiodic CSI-RSs (e.g., aperiodic NZP CSI-RSs, aperiodic ZP CSI-RSs, or aperiodic IMR) transmission (step S21). At the step S21, for example, each of the resources (first resources) may be reserved for each of subframes. In other words, each of the resources (first resources) may be reserved without CSI-RS subframe_config that indicates an interval of CSI-RS transmission and a timing offset of the CSI-RS transmission. For example, at the step S21, the resources (first resources) may be reserved using one or more predetermined CSI-RS configurations indicating REs mapped to antenna ports for the aperiodic CSI-RS transmission. As another example, at the step S21, for example, the resources (first resources) may be reserved using a DM-RS configuration that includes information that indicates antenna ports for the aperiodic CSI-RS transmission. For example, at the step S21, the resources (first resources) may be reserved using information accommodated for CSI-Process, CSI-RS-Config, CSI-RS-ConfigNZP, CSI-RS-ConfigZP, or CSI-RS-IdentityNZP.

Then, the BS 20 may transmit reservation information indicating the reserved resources via higher layer signaling such as the RRC signaling to the UE 10 (step S22). The BS 20 may transmit DCI indicating at least a resource (second resource) to be selected by the UE 10 based on the reserved resources (first resources) to the UE 10 (step S23). Here, the DCI may not be information just for down-selection from reservation resources, but may indicate additional information on top of the reservation information such as information for the number of antenna ports, the number of layers, scrambling, code-division multiplexing (CDM), and/or time/frequency position. The DCI may be an example of lower layer signals. The DCI may be included in an uplink grant. For example, the DCI includes at least a resource index that identifies a resource corresponding to each of the aperiodic CSI-RSs to be selected and received by the UE 10. For example, the DCI further includes information indicating whether the aperiodic ZP CSI-RS is transmitted The BS 20 may transmit aperiodic CSI-RSs (e.g., aperiodic NZP CSI-RSs, aperiodic ZP CSI-RSs, or aperiodic IMR) using the reserved resources (first resources) to the UE 10 (step S24). For example, each of the aperiodic CSI-RSs and the DCI may be multiplexed in the same subframe.

The UE 10 may select the resource (second resource) indicated in the received DCI from the reserved resources (first resources) and receive the aperiodic CSI-RS transmitted using the selected resource (second resource) (step S25). For example, the UE 10 may perform rate matching on the aperiodic CSI-RS using the selected resource when the UE 10 receives the DCI. For example, the UE 10 may determine whether the aperiodic CSI-RS is for the UE10 itself based on the DCI. For example, the UE 10 may compare the RRC configured resource indexes notified at the step S22 with the dynamically signaled resource index notified at the step S23. As a result of comparison, the UE 10 may receive the aperiodic CSI-RS. For example, the UE 10 may perform the CSI reporting based on the received aperiodic CSI-RS.

According to one or more embodiments of a modified second example of the present invention, the BS 20 may transmit presence information of the CSI-RS via lower layer signaling such as DCI so that the UE 10 can identify the aperiodic CSI-RS.

According to one or more embodiments of a modified second example of the present invention, the BS 20 may notify the UE 10 regarding whether the specific UE should receive the aperiodic CSI-RS or not via DCI.

According to one or more embodiments of the modified second example, the BS 20 may transmit an ID that indicates a user equipment that should receive a subframe transmitted from the BS 20 for each subframe via lower layer signaling such as DCI.

Figure 1:
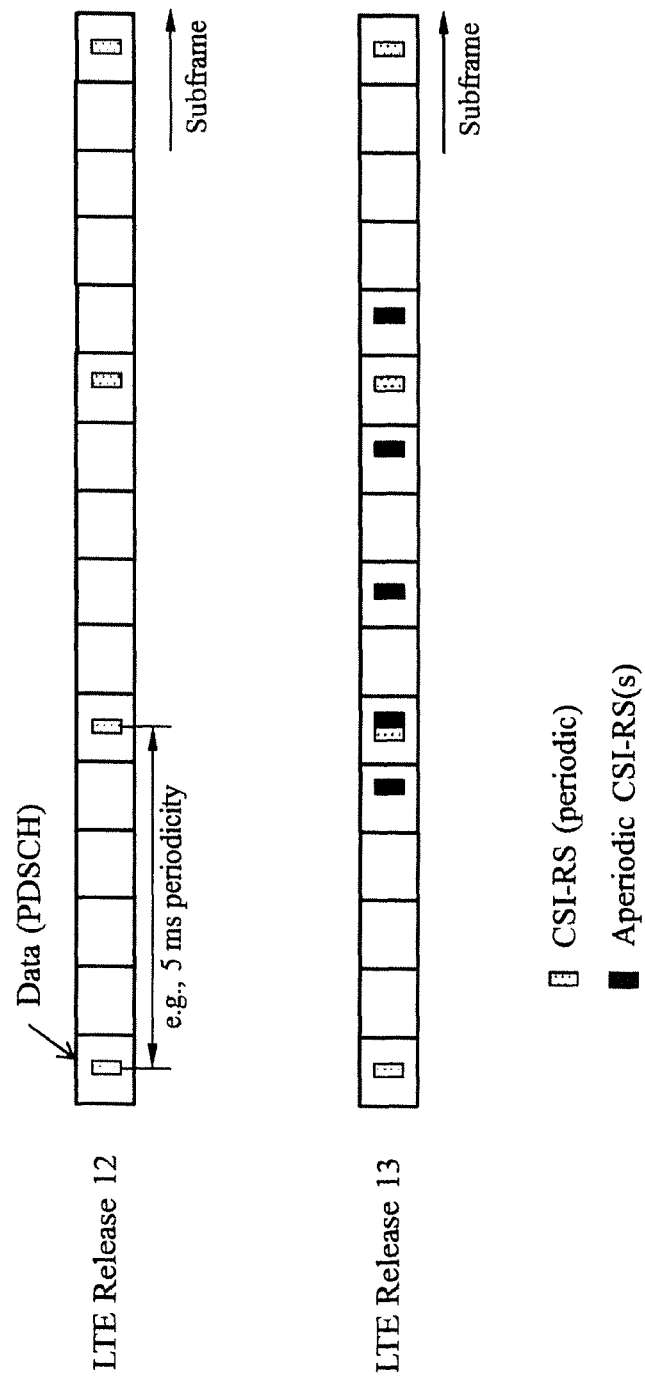
FIG. 1 is a diagram showing subframe configurations of LTE Release 12 and 13 respectively.

According to one or more embodiments of the modified second example, the lower layer signaling may be used for each RE allocated to CSI-RS. For example, when three pairs of REs (e.g., a pair of REs is indicates as "0" and "1" on the same pattern at the upper left in FIG. 1) are allocated to CSI-RSs, the BS 20 may transmit the presence information for each pair of REs which are indicated as bitmaps such as "1 1 0". For example, indexes "1" and "0" of the presence information indicate presence and absence of aperiodic CSI-RS transmission, respectively.

In the above modified second example, for example, the BS 20 may inform the UE 10 of one or more candidates of a combination of presence/absence of the Aperiodic CSI-RS, and the UE 10 may be configured with the candidate(s) and may switch the candidate(s) by dynamic signaling from the BS 20. Furthermore, the BS 20 may inform the UE 10 of the candidate(s) via only higher layer signaling or only lower layer signaling. Furthermore, the combination is not limited to presence/absence of the CSI-RS transmission, but the combination may include the number of CSI-RS antenna ports (or the transmission rank), CSI-RS antenna port information, polarization information and the CSI-RS resource (e.g., a multiplexing information such as time and/or frequency position and Code-Division multiplexing (CDM) related information, density of CSI-RS, a scramble ID). In the above modified second example, for example, the BS 20 may dynamically signal existence of ZP CSI-RS using antenna port information for the DM-RS.

According to one or more embodiments of the modified second example, CSI feedback triggers placed by the BS 20 may serve as aperiodic CSI-RS transmission triggers. For example, when the UE 10 receives the aperiodic CSI-RS transmission trigger from the BS 20, the UE 10 may transmit the CSI-RS feedback based on the CSI-RS after a lapse of a predetermined TTI (Transmission Time Interval) from the reception of the aperiodic CSI-RS transmission trigger. Trigger information on the aperiodic CSI-RS transmission may be included in an uplink (UL) grant. The trigger information may use all or part of bits of the conventional CSI request or additional bits added to the conventional CSI request.

According to one or more embodiments of the modified second example, the BS 20 may transmit CSI-RS transmission information such as the CSI-RS ID, the presence information, and the ID by using UE-Specific Search Space or Common Search Space.

According to one or more embodiments of the modified second example of the present invention, the UE 10 may estimate transmission REs for PDSCH based on the CSI-RS transmission information. For example, the UE 10 may perform rate matching based on the CSI-RS transmission information.

Third Example

Figure 13A:
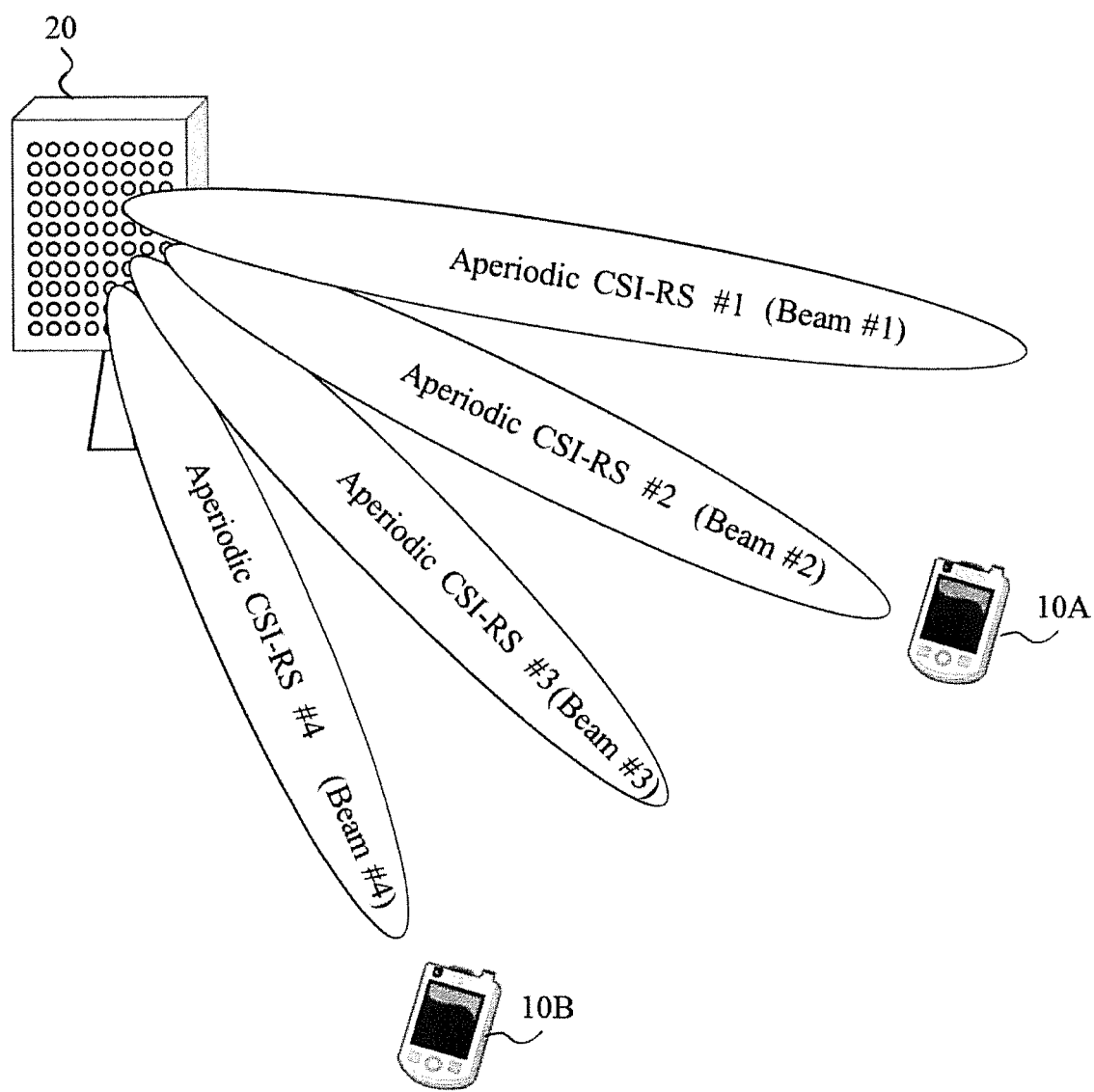
FIG. 13A is a diagram showing aperiodic CSI-RS transmission according to one or more embodiments of a third example of the present invention.

Embodiments of a third example of the present invention will be described with reference to FIGS. 13A and 13B. As shown in FIG. 13A, when the BS 20 transmits aperiodic CSI-RSs, the aperiodic CSI-RSs may be multiplied by different precoders, respectively. For example, averaging results of CSI-RS estimation in different subframes should not be conducted. That is, CSI calculation may use only triggered downlink (DL) subframes.

Figure 13B:
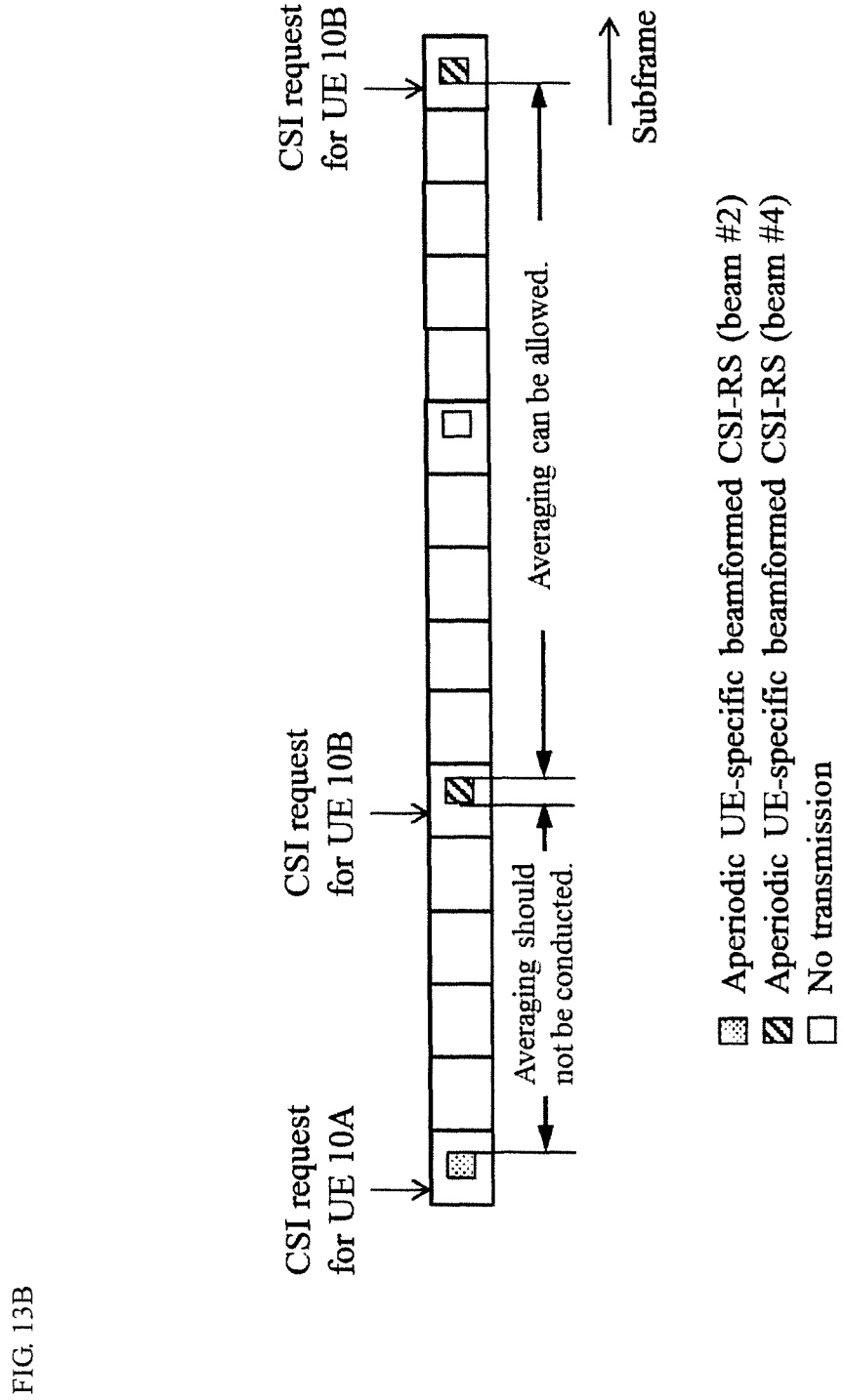
FIG. 13B is a diagram showing a CSI-RS subframe configuration according to one or more embodiments of the third example of the present invention.

As shown in FIG. 13B, CSI-RSs transmitted to the same UE 10 (UE 10B in FIG. 12) may be multiplied by the same beam (beam #4). In this case, allowing for averaging between subframes may cause accuracy of the CSI estimation to be increased.

For example, averaging in triggered subframes that receives a CSI request may be allowed in some cases. In other words, the UE 10 may assume that the same precoder is multiplied for multiple subframes. Therefore, an indicator to allow averaging in subframes can be transmitted. As one example, signaling indicate whether the UE 10 can assume averaging or not with previous subframe(s). It can be designated by the same bits in CSI-RS triggering field. As another example, applicability of averaging can be determined by higher layer signaling. For example, it is possible to have an indicator to indicate whether allocated aperiodic CSI-RS can assume averaging or not. As another example, the UE 10 can assume that all aperiodic CSI-RS is not allowed to conduct averaging in different subframe. Further, averaging in subframes designated by different bits in CSI-RS triggering field may not be allowed. Further still, when CSI process and RRC signaling of NZP CSI-RS are reconfigured, averaging may be initialized.

Fourth Example

Figure 14:
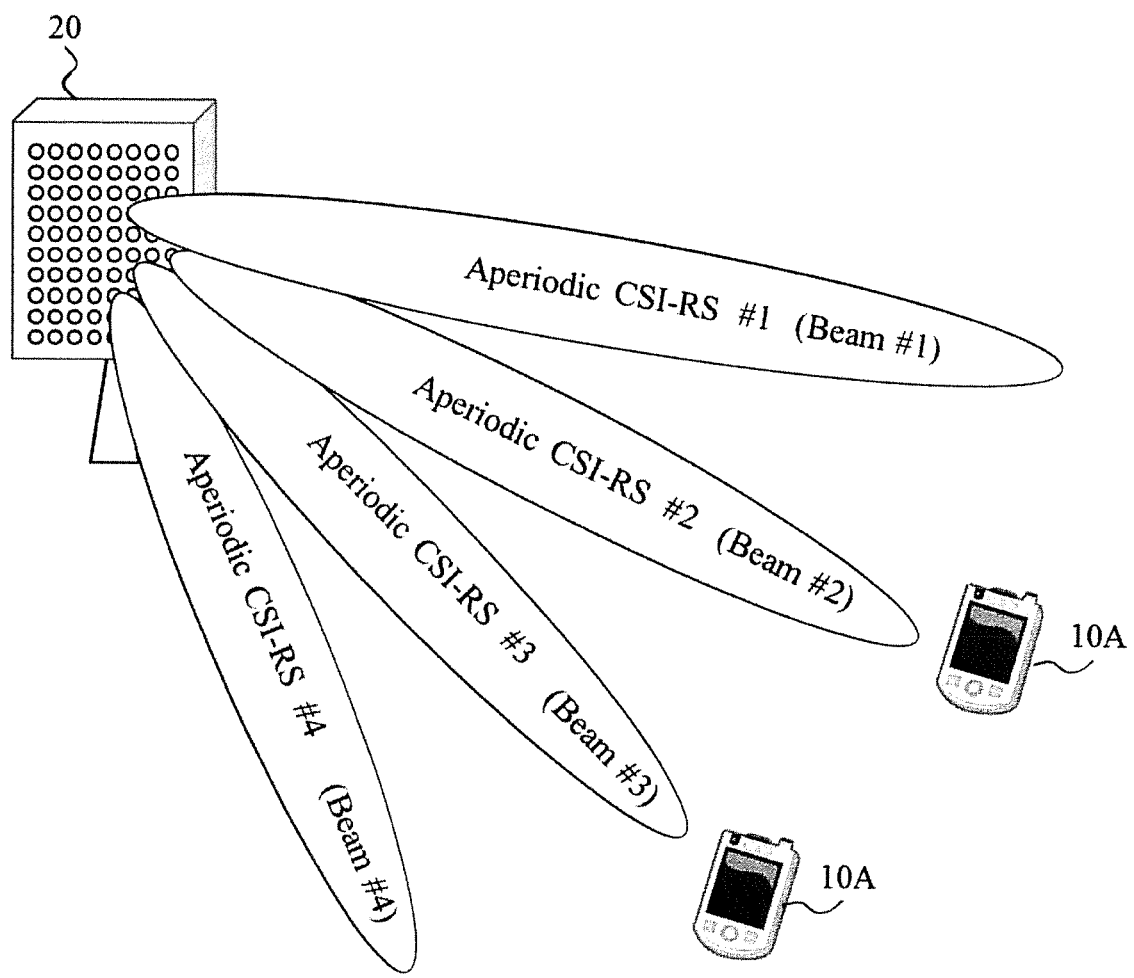
FIG. 14 is a diagram showing aperiodic CSI-RS transmission according to one or more embodiments of a fourth example of the present invention.

Embodiments of a fourth example of the present invention will be described below. According to one or more embodiments, as shown in FIG. 14, when the UE 10A moves between cells, even in the CSI-RS for the same UE 10, the applied beam may be changed. In such a case, allowing for averaging between subframes may not result in accurate CSI.

Therefore, for example, the BS 20 may dynamically transmit signaling that indicates a change of an applied precoder (whether UE 10 can conduct averaging or not). Further, the BS 20 may transmit signaling that indicates whether a multiplied precoder is the same as a multiplied precoder applied to previous subframes or previous triggering subframes.

As another example, predetermined timing (e.g., 100 ms) of reset may be provided instead of using dynamic signaling. For example, timing not to allow for averaging at each predetermined TTI may be provided. Further, a duration and a timing offset may be configured by higher layer or may be defined as a fixed value.

These assumption can differ for CSI feedback for PUSCH and PUCCH. For example, PUCCH based feedback may be derived without averaging assumption, since PUCCH based feedback does not have DCI triggering. On the other hand, PUSCH based feedback may assume averaging in some cases.

As another example, in the assumption of Further enhanced Inter-Cell Interference Coordination (FeICIC) or enhancement for DL-UL Interference Management and Traffic Adaptation (eIMTA), a plurality of subframe sets may be configured. In CSI-RS for the same UE 10, averaging in different subframe sets should not be allowed. For example, when the subframe sets are the same, averaging may be allowed. On the other hand, when the subframe sets are different, averaging may be not allowed. For example, assumption for averaging is signaled per subframe set. For example, assumption for averaging is commonly signaled for subframe set.

As another example, CSI-RS may apply a single beamforming in a whole system band. In such a case, UE can assume that the same precoder is assumed to be multiplied in the whole system.

As another example, CSI-RS may apply a different beamforming by a specific frequency unit. In such a case, averaging over frequency blocks may not be appropriate. For example, averaging of results of CSI-RS estimation within a predetermined frequency block may be allowed. In other words, CSI may be calculated in assumption of the same multiplied precoder. Further, a frequency block may be the same as sub band defined currently. For example, a frequency block may be the same as a precoding resource block group (PRG) defined currently.

This concept (applicability of averaging in time/frequency domain) can be also considered for interference measurement. The UE assumption and/or signaling can be introduced to interference measurement.

Fifth Example

Embodiments of a fifth example of the present invention will be described below. As explained above, the above examples and modified examples for the aperiodic CSI-RS may be applied to the aperiodic ZP CSI-RS and aperiodic IMR.

According to one or more embodiments of the fifth example of the present invention, for example, the ZP CSI-RS may be configured as either of a periodic ZP CSI-RS or an aperiodic ZP CSI-RS (the BS 20 may transmit whether the ZP CSI-RS is periodic or aperiodic). As another example, the ZP CSI-RS may be configured as the aperiodic ZP CSI-RS independently (the BS 20 may transmit detailed information on aperiodic ZP CSI-RS using a parameter, which is specific for aperiodic ZP CSI-RS). As another example, the CSI process or CSI resource may include information that indicates whether the ZP CSI-RS is the periodic ZP CSI-RS or the aperiodic ZP CSI-RS (the BS 20 may transmit the CSI process or CSI resource including implicit or explicit information on the periodic/aperiodic ZP CSI-RS to the UE 10).

According to one or more embodiments of the fifth example of the present invention, the ZP CSI-RS that is multiplexed or not multiplexed on the resource (RE) may be dynamically switched. For example, the BS 20 may transmit the DCI (e.g., DL grant) including information that indicates whether the ZP CSI-RS is multiplexed or not (information on the multiplexed/non-multiplexed ZP CSI-RS) to the UE 10. When the UE 10 receives the DCI including the information on the multiplexed/non-multiplexed ZP CSI-RS, if the ZP CSI-RS is not multiplexed on the RE, the UE 10 may multiplex the PDSCH (or other physical channel/signal) to the RE or the UE 10 may multiplex data on the RE and apply rate matching based on that assumption. On the other hand, when the UE 10 receives the DCI including the information on the multiplexed/non-multiplexed ZP CSI-RS, if the ZP CSI-RS is multiplexed on the RE, the UE 10 may not multiplex the PDSCH to the RE or the UE 10 may not multiplex data on the RE and apply rate matching based on that assumption.

As another example, for example, the DCI may include information other than whether ZP CSI-RS is multiplexed or not multiplexed. For example, DCI may include information on ZP CSI-RS RE, the number of antenna ports of ZP CSI-RS, etc.

As another example, for example, the higher layer signaling may be applied for the switch of the multiplexed/non-multiplexed ZP CSI-RS and/or other dynamic switching. For example, the BS 20 may transmit a set of the multiplexed/non-multiplexed ZP CSI-RSs on a plurality of REs (ZP CSI-RS resource) to the UE 10 by higher layer signaling, and then the UE 10 may switch the multiplexed/non-multiplexed ZP CSI-RS based on the DCI from the BS 20.

As another example, for example, the ZP CSI-RS may be controlled together with the control of the NZP CSI-RS. For example, the BS 20 may transmit the information on the multiplexed/non-multiplexed ZP CSI-RS and NZP CSI-RS by the higher layer signaling, and then the UE 10 may dynamically switch the multiplexed/non-multiplexed ZP CSI-RS and the NZP CSI-RS based on the DCI from the BS 20.

According to one or more embodiments of the fifth example of the present invention, as shown in FIG. 15 of a CSI calculation scheme, the UE 10 may calculate the CSI by combining the periodic/aperiodic NZP CSI-RS and the periodic/aperiodic ZP CSI-RS (IMR). The table of FIG. 15 indicates a combination of "the periodic NZP CSI-RS and the periodic ZP CSI-RS", "the periodic NZP CSI-RS and the aperiodic ZP CSI-RS", "aperiodic NZP CSI-RS and the periodic ZP CSI-RS", and "aperiodic NZP CSI-RS and the aperiodic ZP CSI-RS" for the CSI calculation as "Alt. 1A", "Alt. 1B", "Alt 2A", and "Alt 2B." Furthermore, the CSI process/CSI resource may include either the periodic NZP CSI-RS or the aperiodic NZP CSI-RS. Furthermore, the CSI process/CSI resource may include either the periodic ZP CSI-RS (IMR) or the aperiodic NZP CSI-RS (IMR).

Sixth Example

Embodiments of a sixth example of the present invention will be described below. According to one or more embodiments of a sixth example of the present invention, as in "Alt 4A" and "Alt 4B" in the table of FIG. 16, the UE 10 may perform the periodic and aperiodic CSI reporting based on the aperiodic NZP CSI-RS and the aperiodic ZP CSI-RS. The legacy LTE standard supports a CSI reporting scheme for "Alt 3A" and "Alt 3B."

According to one or more embodiments of the sixth example of the present invention, when the UE 10 performs the aperiodic CSI reporting based on the aperiodic CSI-RS from the BS 20 ("Alt 4B" in FIG. 16), the UE 10 may not calculate the CSI until the UE 10 receives the CSI request triggering a CSI report from the BS 20 (in other words, the UE 10 may calculate the CSI on reception of the CSI request). As a result, it may be possible to reduce the load to calculate the CSI in the UE 10, which is not reported to BS 20.

For example, subframe l is a subframe where the CSI request (or a trigger to indicate that aperiodic NZP CSI-RS and/or aperiodic ZP CSI-RS is transmitted) is transmitted (or the CSI report is triggered).

Furthermore, for example, when the CSI request is transmitted on subframe l, the UE 10 may assume that aperiodic CSI-RS is multiplexed in an earliest subframe after (or same) subframe l, where the aperiodic CSI-RS resource is reserved. Then, the UE 10 may calculate the CSI based on the subframe, where the aperiodic CSI-RS is transmitted earliest after the subframe l.

Furthermore, for example, when the CSI request is transmitted on subframe l, the UE 10 may assume subframe l+k includes the aperiodic CSI-RS (the aperiodic CSI-RS resource is ON in the subframe l+k). Then, the UE 10 may calculate the CSI based on the subframe l+k. The k indicates a timing offset between the CSI request and the aperiodic CSI-RS. For example, the k may be a constant. For example, the k may be parameter configured by higher layer signaling such as RRC signaling or the DCI. For example, the k may be zero.

Furthermore, the CSI reporting scheme based on the aperiodic CSI-RS according to one or more embodiments of the sixth example of the present invention may be applied to not only the CSI-RS (NZP CSI-RS) but also the ZP CSI-RS (IMR). Furthermore, the time offset k may be set independently of the CSI-RS (NZP CSI-RS) and the ZP CSI-RS (IMR).

Seventh Example

Embodiments of a seventh example of the present invention will be described below. In one or more embodiments of the seventh example of the present invention, subframes m and n indicate a subframe where the aperiodic CSI-RS is transmitted and a subframe where the CSI feedback is transmitted, respectively. As described above, subframe l is a subframe where the CSI request is transmitted. One example procedure can be, first the UE 10 receives the CSI request triggering the CSI reporting, then the UE 10 receives the aperiodic CSI-RS, and finally the UE 10 transmits the CSI feedback (performs the CSI reporting). Therefore, subframe n is greater than (or equal to) subframe m and subframe m is greater than (or equal to) subframe l (n>m>l). However, this invention is not limited to this case. For example, subframe n may be greater than subframe l and subframe l may be greater than subframe m (n>l>m).

Figure 17:
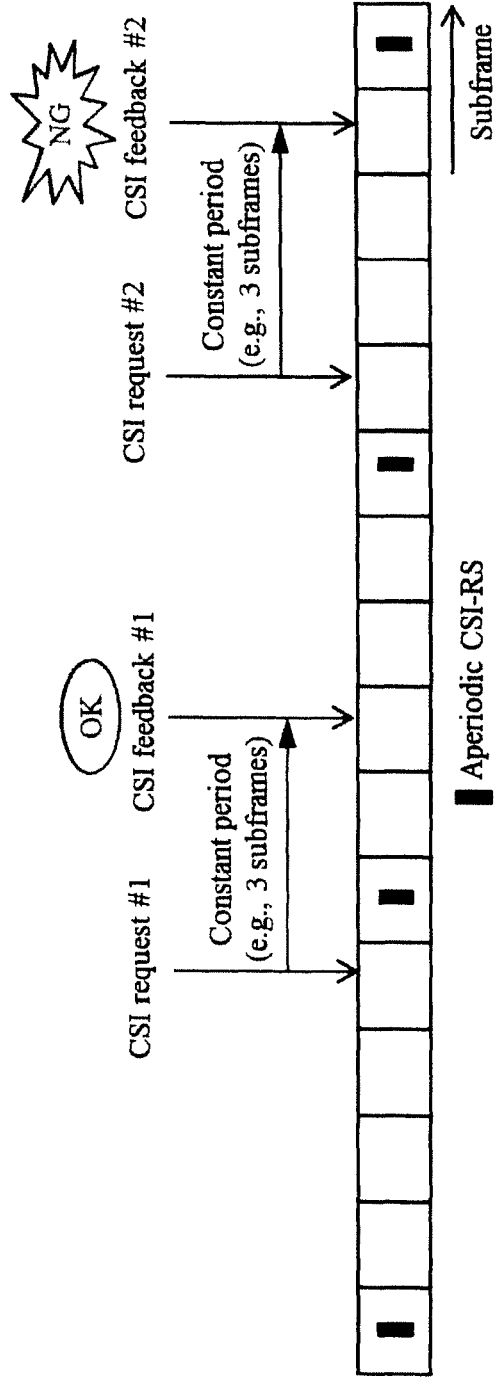
FIG. 17 is a diagram to explain a CSI report based on the aperiodic CSI-RS transmission according to a procedure of the legacy LTE standard.

Furthermore, the legacy LTE standard defines the CSI feedback timing so that the UE 10 transmits the CSI feedback when the constant period elapses after the reception of the CSI request. As shown in FIG. 17, for example, the UE 10 may transmit the CSI feedback after constant period (e.g., three subframes) from the reception of the CSI request (CSI request #1 and #2). The reception of the aperiodic CSI-RS may follow the CSI feedback timing for CSI feedback #2. That is, subframe m may be greater than subframe n and/or subframe n may be greater than subframe l (e.g., m>n>l). As a result, the CSI reporting may not be normally performed because the UE 10 is not be able to determine what should be reported as the CSI feedback such as the CSI feedback #2.

Figure 18A:
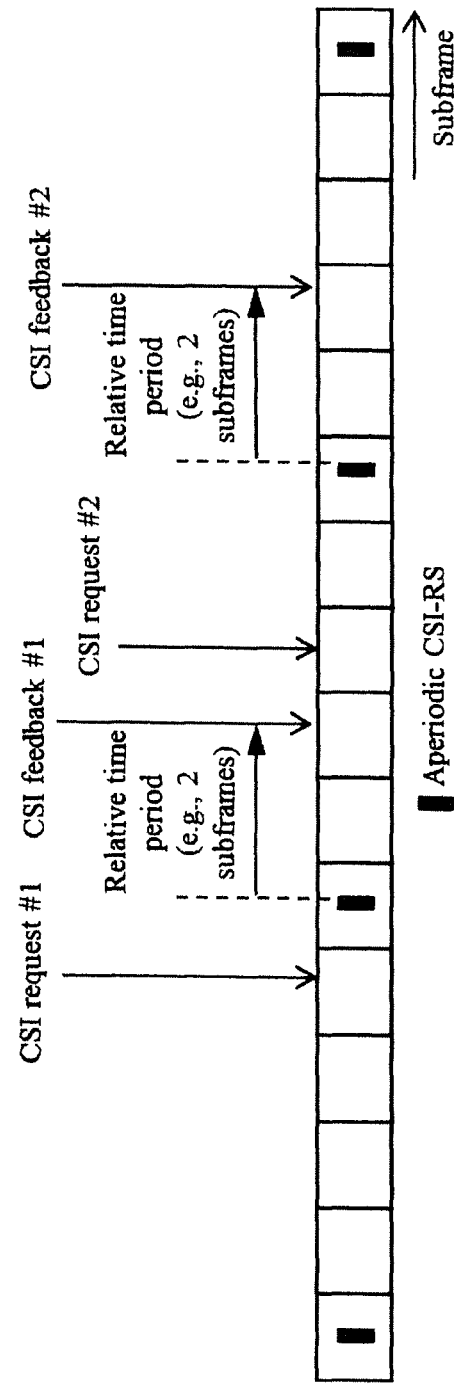
FIG. 18A is a diagram to explain a CSI report based on the aperiodic CSI-RS transmission according to one or more embodiments of a seventh example of the present invention.

According to one or more embodiments of the seventh example of the present invention, as shown in FIG. 18A, the CSI feedback timing may be determined as a relative time value (e.g., two subframes) to the reception time of the aperiodic CSI-RS by the UE 10. Thus, the UE 10 may transmit the CSI feedback (calculate the CSI) after the relative time period (predetermined time period) from when the UE 10 receives the aperiodic CSI-RS, to the BS 20. In other words, the UE 10 may not transmit the CSI feedback until the UE 10 receives the aperiodic CSI-RS. For example, the relative time value may be uniquely defined in the LTE standard. For example, the BS 20 may transmit the relative time value via the higher layer signaling such as the RRC signaling. For example, the relative time value may be dynamically switched using the DCI.

In the above example, timing of the CSI reporting may be concentrated on a specific subframe. For example, when the relative time value is 2 subframes, the CSI reporting may be concentrated on the subframe l+2. For avoiding such a burst CSI reporting, a UE-specific offset value may be set to the timing of the CSI reporting or the relative time value may be a UE-specific value. For example, the UE-specific offset value and the UE-specific relative time value may be derived based on a UE-specific ID such as a UE ID. For example, the UE-specific offset value and the UE-specific relative time value may be transmitted to the UE 10 via the RRC signaling or may be reported to the UE 10 using the DCI.

Furthermore, for example, as a modified example of FIG. 18A, the relative time triggering the CSI report is not limited to the relative time to the reception time of the aperiodic CSI-RS, but it may be a relative time to timing when the UE 10 measures interference based on the IMR, or the reception time of the aperiodic CSI-RS or the timing when the UE 10 measures interference based on the IMR, whichever is earlier or later.

Figure 18B:
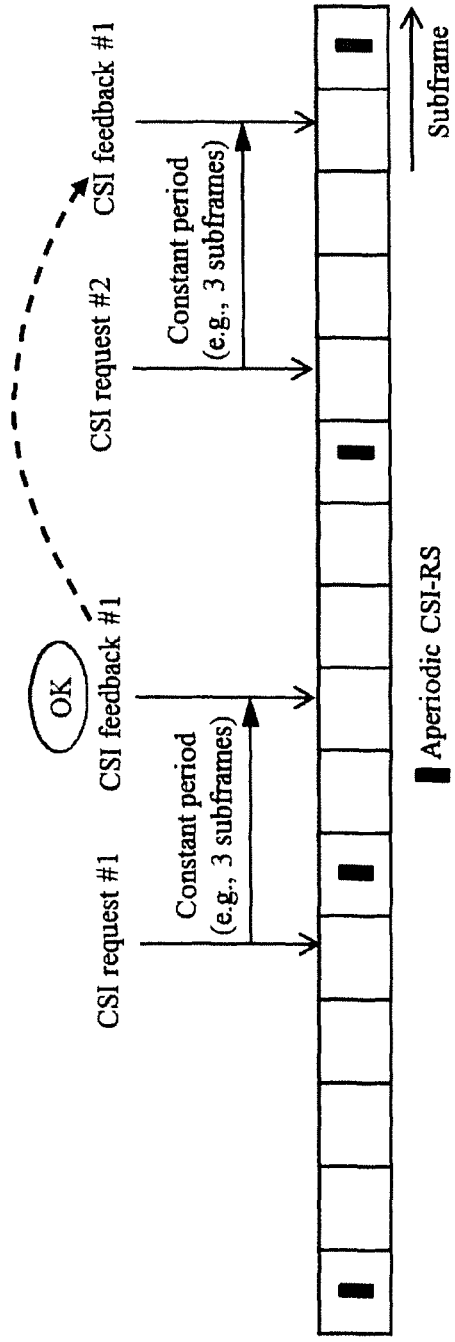
FIG. 18B is a diagram to explain a CSI report based on the aperiodic CSI-RS transmission according to one or more embodiments of another example of the seventh example of the present invention.

According to one or more embodiments of another example of the seventh example of the present invention, as shown in FIG. 18B, when subframe m is greater than subframe n and subframe n is greater than subframe l (m>n>l) and an error is occurred in the UE 10, i.e., the UE 10 should report CSI before receiving CSI-RS, the UE 10 may transmits the same CSI feedback as the last time. For example, in FIG. 18B, after the reception of the CSI request #2, when the constant period (e.g., three subframes) elapses before the CSI calculation (reception of the aperiodic CSI-RS), the UE 10 may transmit the CSI feedback #1 as same as the last CSI feedback. As a result, the error caused by the reverse of the CSI reporting procedure (m>n>l) may not be avoided.

Furthermore, for example, as a modified example of FIG. 18B, when subframe m is greater than subframe n and subframe n is greater than subframe l (m>n>l), the UE 10 may calculate a CSI based on the latest CSI contained in the UE 10. For example, when it is possible to update the NZP CSI-RS or ZP CSI-RS (IMR), the UE 10 may recalculate the CSI based on the updated NZP CSI-RS or ZP CSI-RS (IMR).

Furthermore, for example, as a modified example of FIG. 18B, the UE 10 may report information indicating the occurred error (an error flag) caused by the reverse of the CSI reporting procedure (m>n>l) to the BS 20. Furthermore, the reported CSI may be not defined in the LTE standard.

Figure 18C:
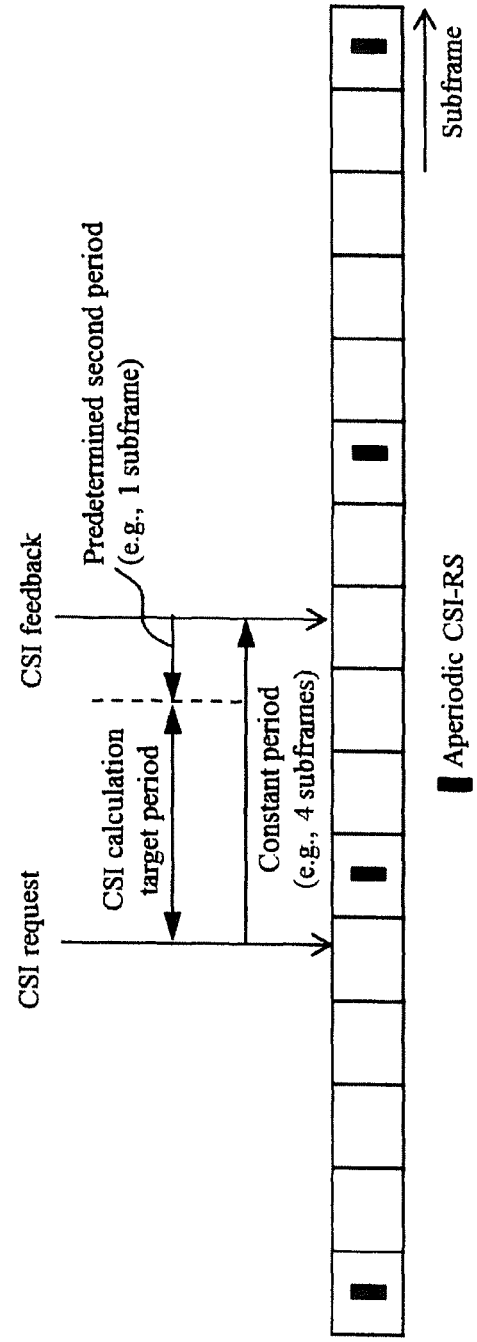
FIG. 18C is a diagram to explain a CSI report based on the aperiodic CSI-RS transmission according to one or more embodiments of another example of the seventh example of the present invention.

According to one or more embodiments of another example of the seventh example of the present invention, as described above, under the CSI reporting procedure based on the legacy LTE standard, the UE 10 may transmit the CSI feedback after the constant period from the reception of the CSI request. In addition, as shown in FIG. 18C, in one or more embodiments of another example of the seventh example of the present invention, the UE 10 may calculate the CSI based on the aperiodic CSI-RS (which is the NZP CSI-RS and/or the ZP CSI-RS (IMR)) in a subframe other than a predetermined second period prior to the CSI feedback to the BS 20. In other words, when the aperiodic CSI-RS is transmitted within a CSI calculation target period, the UE 10 may calculate the CSI and transmit the CSI-RS feedback. The UE 10 may not calculate the CSI based on the aperiodic CSI-RS in the predetermined second period taking into account the UE 10's processing time for the CSI calculation.

Figure 18D:
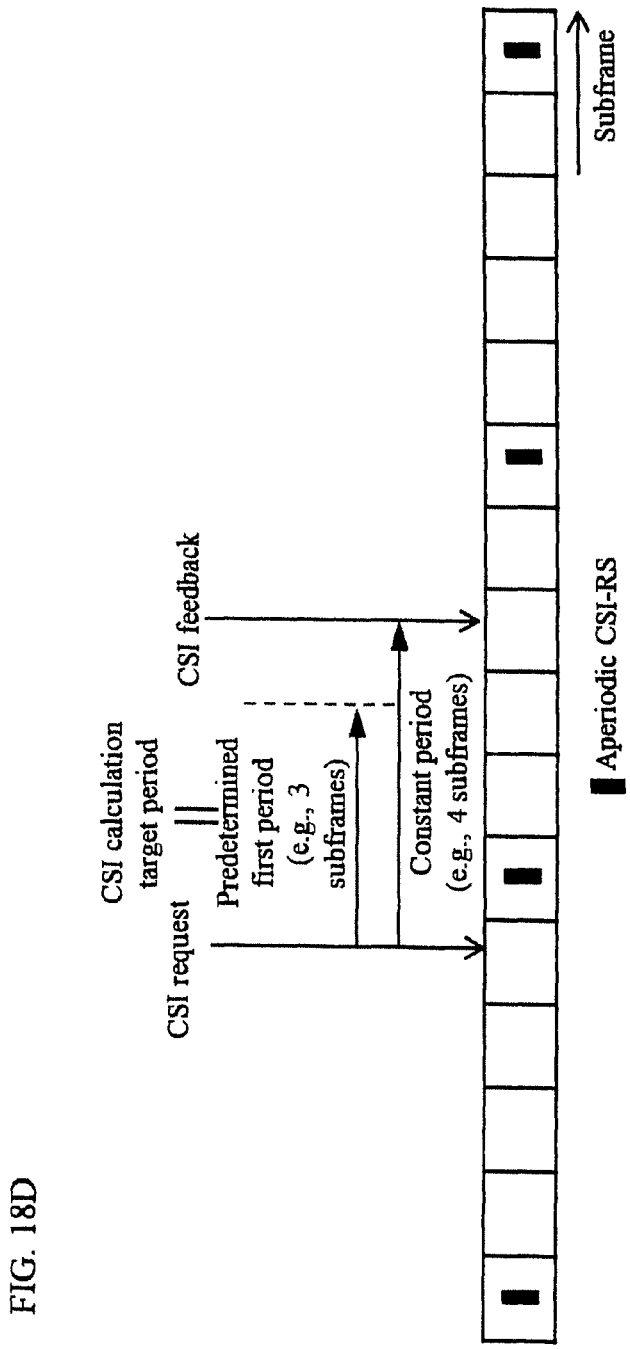
FIG. 18D is a diagram to explain a CSI report based on the aperiodic CSI-RS transmission according to one or more embodiments of another example of the seventh example of the present invention.

According to one or more embodiments of another example of the seventh example of the present invention, as described above, under the CSI reporting procedure based on the legacy LTE standard, the UE 10 may transmit the CSI feedback after the constant period from the reception of the CSI request. In addition, as shown in FIG. 18D, in one or more embodiments of another example of the seventh example of the present invention, when the UE 10 receives the CSI request, the UE 10 may calculate the CSI based on the aperiodic CS-RS (which is the NZP CSI-RS and/or the ZP CSI-RS (IMR)) in a predetermined first period that is the CSI calculation target period and transmit the CSI feedback to the BS 20. The predetermined first period is a predetermined period (subframe(s)) from when the UE 10 receives the CSI request. In other words, On the other hand, when the UE 10 receive the CSI request within the constant period and in a period other than the predetermined first period, the UE 10 may not calculate the CSI taking into account the UE 10's processing time for the CSI calculation.

Furthermore, for example, as a modified example of FIGS. 18C and 8D, the CSI reporting scheme as shown in FIGS. 20C and 20D may be combined with each other. Furthermore, for example, the offset value(s) (the first predetermined period and the second predetermined period) may be transmitted from the BS 20 to the UE 10 via the higher layer signaling and/or the lower layer signaling.

Configuration of Base Station

The BS 20 according to one or more embodiments of the present invention will be described below with reference to the FIG. 19.

Figure 19:
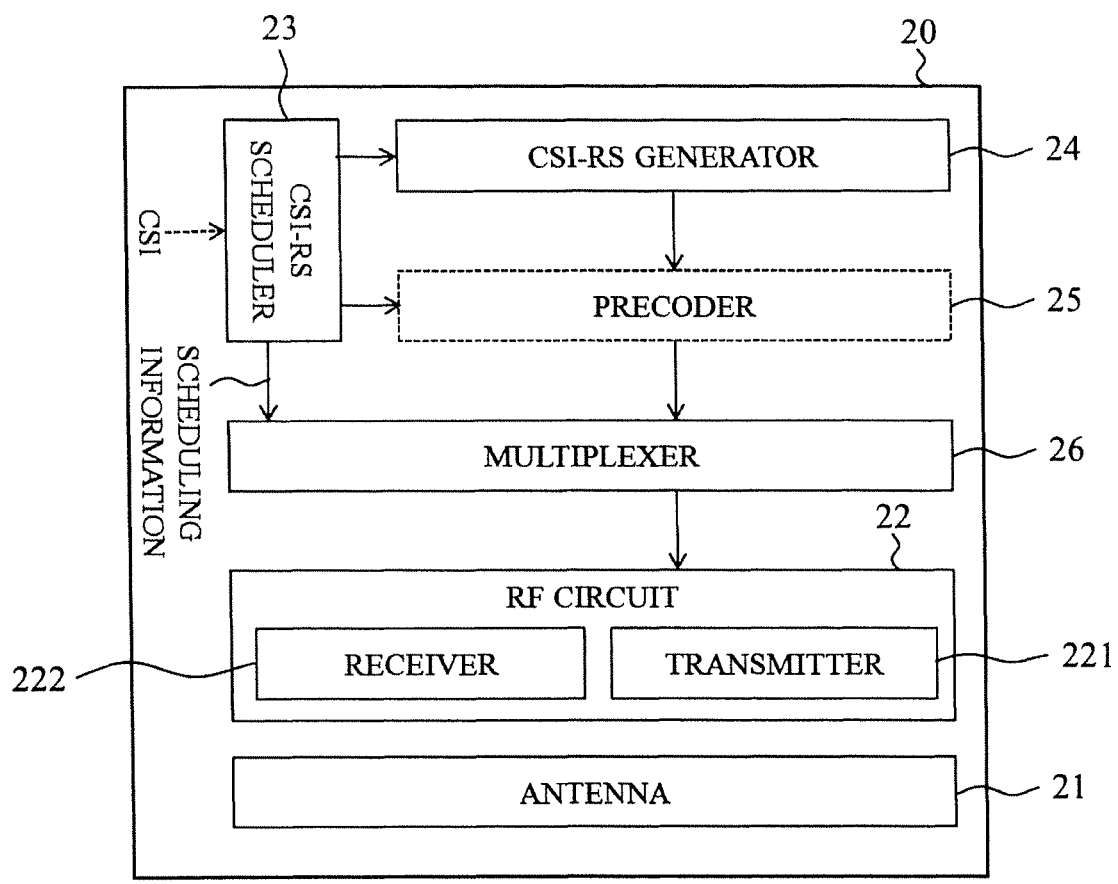
FIG. 19 is a functional block diagram of a base station according to one or more embodiments of the present invention.

As shown in FIG. 19, the BS 20 may comprise an antenna 21 for 3D MIMO, a Radio Frequency (RF) Circuit 22, a CSI-RS scheduler 23, a CS-RS generator 24, a precoder 25, and a multiplexer 26. The RF circuit 22 includes a transmitter (TXRU) 221 and a receiver 222.

The antenna 21 may comprise a multi-dimensional antenna that includes multiple antenna elements such as a 2D antenna (planar antenna) or a 3D antenna such as antennas arranged in a cylindrical shape or antennas arranged in a cube. The antenna 21 includes antenna ports having one or more antenna elements. The beam transmitted from each of the antenna ports is controlled to perform 3D MIMO communication with the UE 10.

The antenna 21 allows the number of antenna elements to be easily increased compared with linear array antenna. MIMO transmission using a large number of antenna elements is expected to further improve system performance. For example, with the 3D beamforming, high beamforming gain is also expected according to an increase in the number of antennas. Furthermore, MIMO transmission is also advantageous in terms of interference reduction, for example, by null point control of beams, and effects such as interference rejection among users in multi-user MIMO can be expected.

The RF circuit 22 generates input signals to the antenna 21 and performs reception processing of output signals from the antenna 21.

The transmitter 221 included in the RF circuit 22 transmits data signals (for example, reference signals and precoded data signals) via the antenna 21 to the UE 10. The transmitter 221 transmits CSI-RS resource information that indicates a state of the determined CSI-RS resources (for example, subframe configuration ID and mapping information) to the UE 20 via higher layer signaling or lower layer signaling. The transmitter 221 transmits the CSI-RS allocated to the determined CSI-RS resources to the UE 10.

The receiver 222 included in the RF circuit 22 receives data signals (for example, reference signals and the CSI feedback information) via the antenna 21 from the UE 10.

The CSI-RS scheduler 23 determines CSI-RS resources allocated to the CSI-RS. For example, the CSI-RS scheduler 23 determines a CSI-RS subframe that includes the CSI-RS in subframes. The CSI-RS scheduler 23 determines at least an RE that is mapped to the CSI-RS.

The CSI-RS generator 24 generates CSI-RS for estimating the downlink channel states. The CSI-RS generator 24 may generate reference signals defined by the LTE standard, dedicated reference signal (DRS) and Cell-specific Reference Signal (CRS), synchronized signals such as Primary synchronization signal (PSS) and Secondary synchronization signal (SSS), and newly defined signals in addition to CSI-RS The precoder 25 determines a precoder applied to the downlink data signals and the downlink reference signals. The precoder is called a precoding vector or more generally a precoding matrix. The precoder 25 determines the precoding vector (precoding matrix) of the downlink based on the CSI indicating the estimated downlink channel states and the decoded CSI feedback information inputted.

The multiplexer 26 multiplexes CSI-RS on REs based on the determined CSI-RS resources by the CSI-RS scheduler 23.

The transmitted reference signals may be Cell-specific or UE-specific. For example, the reference signals may be multiplexed on the signal such as PDSCH, and the reference signal may be precoded. Here, by notifying a transmission rank of reference signals to the UE 10, estimation for the channel states may be realized at the suitable rank according to the channel states.

Configuration of User Equipment

The UE 10 according to one or more embodiments of the present invention will be described below with reference to the FIG. 20.

Figure 20:
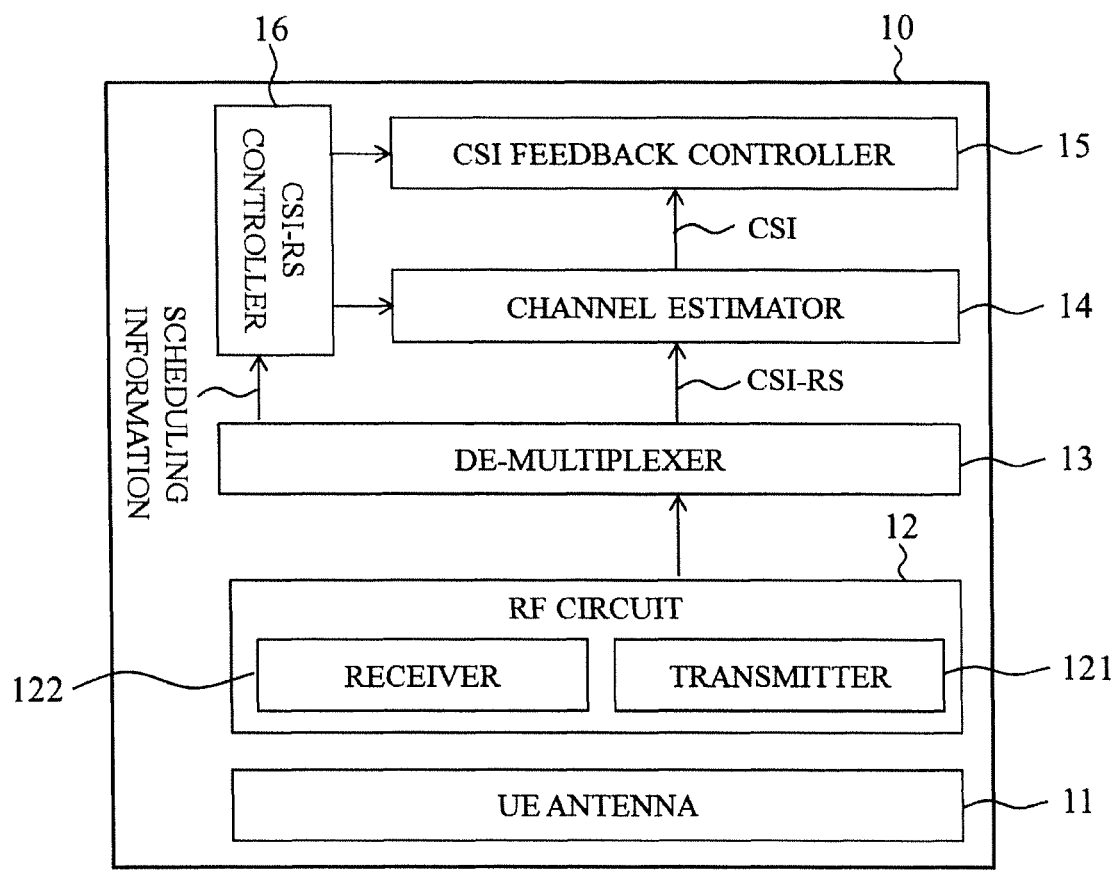
FIG. 20 is a structure diagram of an example of a UE according to one or more embodiments of the present invention.

As shown in FIG. 20, the UE 10 may comprise a UE antenna 11 used for communicating with the BS 20, an RF circuit 12, a de-multiplexer 13, a channel estimator 14, CSI feedback controller 15, and a CSI-RS controller 16. The RF circuit 12 includes a transmitter 121 and a receiver 122.

The transmitter 121 included in the RF circuit 12 transmits data signals (for example, reference signals and the CSI feedback information) via the UE antenna 11 to the BS 20.

The receiver 122 included in the RF circuit 12 receives data signals (for example, reference signals such as CSI-RS) via the UE antenna 11 from the BS 20.

The de-multiplexer 13 separates a PDCCH signal from a signal received from the BS 20.

The Channel estimator 14 estimates downlink channel states based on the CSI-RS transmitted from the BS 20, and then outputs a CSI feedback controller 15.

The CSI feedback controller 15 generates the CSI feedback information based on the estimated downlink channel states using the reference signals for estimating downlink channel states. The CSI feedback controller 15 outputs the generated CSI feedback information to the transmitter 121, and then the transmitter 121 transmits the CSI feedback information to the BS 20. The CSI feedback information may include at least one of Rank Indicator (RI), PMI, CQI, BI and the like.

The CSI-RS controller 16 determines whether the specific user equipment is the user equipment itself based on the CSI-RS resource information when CSI-RS is transmitted from the BS 20. When the CSI-RS controller 16 determines that the specific user equipment is the user equipment itself, the transmitter that CSI feedback based on the CSI-RS to the BS 20.

Other Examples

In one or more embodiments of the present invention, an example will be described that the wireless communication system 1 is a 3D MIMO system, but the present invention is not limited thereto. In the present invention, a 2D MIMO system may be the wireless communication system.

The above examples and modified examples may be combined with each other, and various features of these examples can be combined with each other in various combinations. The invention is not limited to the specific combinations disclosed herein.

The aperiodic CSI-RS according to one or more embodiments of the present invention may be transmitted to a single UE 10 or a plurality of UEs 10.

In one or more embodiments of the present invention, an example will be described that the CSI-RS is the CSI-RS, but the present invention is not limited thereto. The present invention may apply to the CSI-RS but not the beamformed CSI-RS.

In one or more embodiments of the present invention, an example will be described that the BS 20 includes planar antenna, but the present invention is not limited thereto. In the present invention, the BS 20 may include a one-dimensional antenna or a predetermined three-dimensional antenna.

In one or more embodiments of the present invention, some examples will be described that various technologies of these examples are applied to the CSI-RS (NZP CSI-RS), but the present invention is not limited thereto. The present invention may apply to not only the CSI-RS (NZP CSI-RS), but also the ZP CSI-RS.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

EXPLANATION OF REFERENCES

1 Wireless communication system
10 User equipment (UE)
11 UE antenna
12 RF circuit
121 Transmitter
122 Receiver
13 DE Multiplexer
14 Channel estimator
15 CSI feedback controller
16 CSI-RS controller
20 Base station (BS)
21 Antenna
22 RF circuit 221 Transmitter
222 Receiver
23 CSI-RS scheduler
24 CSI-RS generator
25 Precoder
26 Multiplexer

What is claimed is:

1. A method for a radio communication system that comprises a base station (BS) and a user equipment (UE), the method comprising:
   transmitting, from the BS to the UE, a first timing offset between a time when a trigger request that triggers to perform an aperiodic Channel State Information (CSI) reporting is transmitted and a time when a Non-Zero Power Channel State Information Reference Signal (NZP CSI-RS) is transmitted;
   transmitting, from the BS to the UE, the trigger request;
   transmitting, from the BS to the UE, the NZP CSI-RS and Interference Measurement Resources (IMRs) that are aperiodic IMRs or periodic IMRs;
   measuring, with the UE, the NZP CSI-RS;
   performing, with the UE, interference measurement, based on the IMRs, by applying a second timing offset, the second timing offset being between the time when the trigger request is transmitted and a time when the IMRs are transmitted; and
   transmitting, from the UE to the BS, the aperiodic CSI reporting based on the interference measurement,
   wherein resources of the NZP CSI-RS and the IMRs are configured separately,
   wherein when using the NZP CSI-RS to perform NZP CSI-RS measurement that is different from the interference measurement, the UE performs the NZP CSI-RS measurement based on the first timing offset,
   wherein the IMRs are different from the NZP CSI-RS,
   wherein when the UE performs the interference measurement based on the IMRs by applying the second timing offset, a value of the second timing offset is the same as a value of the first timing offset, and
   wherein the first timing offset and the second timing offset are set independently.

2. The method according to claim 1, further comprising:
   notifying, with the BS, the UE of information indicating that the IMRs are aperiodic IMRs or periodic IMRs.

3. The method according to claim 1, further comprising:
   transmitting, from the BS to the UE, Down Link Control Information (DCI) that indicates whether the IMRs are multiplexed on resource elements (REs).

4. The method according to claim 1, wherein Physical Downlink Shared Channels (PDSCHs) are not multiplexed on REs mapped to the aperiodic IMRs.

5. The method according to claim 1, further comprising:
   notifying, with the BS, the UE of CSI feedback timing indicating when the aperiodic CSI reporting is performed; and
   wherein the UE performs the aperiodic CSI reporting based on the CSI feedback timing.

6. A user equipment (UE) comprising:
   a receiver that receives, from a base station (BS), a first timing offset between a time when a trigger request that triggers to perform an aperiodic Channel State Information (CSI) reporting is transmitted and a time when a Non-Zero Power Channel State Information Reference Signal (NZP CSI-RS) is transmitted; receives, from the BS, the trigger request; and, receives, from the BS, the NZP CSI-RS and Interference Measurement Resources (IMRs) that are aperiodic IMRs; and
   a controller that measures the NZP CSI-RS; performs an interference measurement, based on the IMRs, by applying a second timing offset, the second timing offset being between the time when the trigger request is transmitted and a time when the IMRs are transmitted; and controls to transmit, to the BS, the aperiodic CSI reporting based on the interference measurement,
   wherein resources of the NZP CSI-RS and the IMRs are configured separately,
   wherein when using the NZP CSI-RS to perform NZP CSI-RS measurement that is different from the interference measurement, the controller performs the NZP CSI-RS measurement based on the first timing offset,
   wherein the IMRs are different from the NZP CSI-RS,
   wherein when the controller performs the interference measurement based on the IMRs by applying the second timing offset, a value of the second timing offset is the same as a value of the first timing offset, and
   wherein the first timing offset and the second timing offset are set independently.

7. The UE according to claim 6, wherein the receiver receives, from the BS, information indicating that the IMRs are aperiodic IMRs or periodic IMRs.

8. The UE according to claim 6, wherein the receive that receives from the BS, Down Link Control Information (DCI) that indicates whether the IMRs are multiplexed on resource elements (REs).

9. The UE according to claim 6, wherein Physical Downlink Shared Channels (PDSCHs) are not multiplexed on REs mapped to the aperiodic IMRs.

10. The UE according to claim 6,
    wherein the receiver receives, from the BS, CSI feedback timing indicating when the aperiodic CSI reporting is performed; and
    wherein the controller controls to transmit the aperiodic CSI reporting based on the CSI feedback timing.

11. A base station (BS) comprising:
    a transmitter that transmits, to a user equipment (UE), a first timing offset between a time when a trigger request that triggers to perform an aperiodic Channel State Information (CSI) reporting is transmitted and a time when a Non-Zero Power Channel State Information Reference Signal (NZP CSI-RS) is transmitted; transmits, to the UE, the trigger request; and transmits, to the UE, the NZP-CSI-RS and Interference Measurement Resources (IMRs) that are aperiodic IMRs; and
    a receiver that receives, from the UE, the aperiodic CSI reporting, based on the IMRs, by being applied a second timing offset, the second timing offset being between the time when the trigger request is transmitted and a time when the IMRs are transmitted,
    wherein resources of the NZP CSI-RS and the IMRs are configured separately,
    wherein when using the NZP CSI-RS to perform NZP CSI-RS measurement that is different from the interference measurement, the UE performs the NZP CSI-RS measurement based on the first timing offset,
    wherein the IMRs are different from the NZP CSI-RS,
    wherein when the UE performs the interference measurement based on the IMRs by applying the second timing offset, a value of the second timing offset is the same as a value of the first timing offset, and
    wherein the first timing offset and the second timing offset are set independently.

12. The BS according to claim 11, wherein the transmitter transmits, to the UE, information indicating that the IMRs are aperiodic IMRs or periodic IMRs.

13. The BS according to claim 11, wherein the transmitter transmits, to the UE, Down Link Control Information (DCI) that indicates whether the IMRs are multiplexed on resource elements (REs).

* * * * *